(12) United States Patent
Garcia-Perez et al.

(10) Patent No.: US 11,542,437 B2
(45) Date of Patent: *Jan. 3, 2023

(54) METHOD AND SYSTEM FOR PERFORMING THERMOCHEMICAL CONVERSION OF A CARBONACEOUS FEEDSTOCK TO A REACTION PRODUCT

(71) Applicants: TerraPower, LLC, Bellevue, WA (US); Washington State University, Pullman, WA (US)

(72) Inventors: Manuel Garcia-Perez, Pullman, WA (US); Joshua C. Walter, Kirkland, WA (US)

(73) Assignee: TerraPower, LLC, Bellevue, WA (US)

( * ) Notice: Subject to any disclaimer, the term of this patent is extended or adjusted under 35 U.S.C. 154(b) by 153 days.

This patent is subject to a terminal disclaimer.

(21) Appl. No.: 17/033,319

(22) Filed: Sep. 25, 2020

(65) Prior Publication Data
US 2021/0087472 A1    Mar. 25, 2021

Related U.S. Application Data

(63) Continuation of application No. 16/193,761, filed on Nov. 16, 2018, now Pat. No. 10,787,609, which is a (Continued)

(51) Int. Cl.
*C10G 1/00* (2006.01)
*C10G 1/02* (2006.01)

(52) U.S. Cl.
CPC ............. *C10G 1/008* (2013.01); *C10G 1/02* (2013.01); *C10J 2300/0969* (2013.01); *Y02P 20/54* (2015.11)

(58) Field of Classification Search
CPC ............. Y02P 20/54; C10J 2300/0969; B01D 11/0403; B01D 11/0407
See application file for complete search history.

(56) References Cited

U.S. PATENT DOCUMENTS 3,115,394 A    12/1963   Gorin et al.
3,890,908 A     6/1975   von Klenck et al.
(Continued)

FOREIGN PATENT DOCUMENTS

CA    2696910    9/2011
CA    2956521    7/2015
(Continued)

OTHER PUBLICATIONS

Chornet et at, Biomass Liquefaction: An Overview, 1985 Elsevier Applied Science Publishers Ltd, pp. 967-1002.
(Continued)

*Primary Examiner* — Imran Akram
(74) *Attorney, Agent, or Firm* — Merchant and Gould P.C.

(57) ABSTRACT

The thermochemical conversion of biomass material to one or more reaction products includes generating thermal energy with at least one heat source, providing a volume of feedstock, providing a volume of supercritical fluid, transferring a portion of the generated thermal energy to the volume of supercritical fluid, transferring at least a portion of the generated thermal energy from the volume of supercritical fluid to the volume of feedstock, and performing a thermal decomposition process on the volume of feedstock with the thermal energy transferred from the volume of supercritical fluid to the volume of the feedstock in order to form at least one reaction product.

20 Claims, 24 Drawing Sheets

Related U.S. Application Data continuation of application No. 14/209,798, filed on Mar. 13, 2014, now Pat. No. 10,144,874.

(60) Provisional application No. 61/794,121, filed on Mar. 15, 2013.

(56) References Cited

U.S. PATENT DOCUMENTS

| | | | |
|---|---|---|---|
| 4,138,442 A | 2/1979 | Chang et al. | |
| 4,358,344 A | 11/1982 | Sass et al. | |
| 4,692,239 A | 9/1987 | Friedman | |
| 5,344,848 A | 9/1994 | Steinberg et al. | |
| 5,386,055 A | 1/1995 | Lee et al. | |
| 5,868,856 A * | 2/1999 | Douglas | C11D 11/0047 134/28 |
| 6,783,877 B2 | 8/2004 | Shimazu et al. | |
| 7,569,204 B2 | 8/2009 | Leveson | |
| 8,579,996 B2 | 11/2013 | Humphreys | |
| 8,771,387 B2 | 7/2014 | Simmons et al. | |
| 8,647,401 B2 | 11/2014 | Self et al. | |
| 9,068,131 B2 | 6/2015 | Ginestra | |
| 9,376,639 B2 | 6/2016 | Walter | |
| 10,144,874 B2 | 12/2018 | Walter | |
| 10,760,004 B2 | 9/2020 | Garcia-Perez | |
| 10,787,609 B2 | 9/2020 | Garcia-Perez | |
| 10,787,610 B2 | 9/2020 | Goodrich | |
| 2002/0031690 A1 | 3/2002 | Shimazu et al. | |
| 2002/0048545 A1 | 4/2002 | Lewis | |
| 2002/0155062 A1 | 10/2002 | Lightner | |
| 2004/0232046 A1 | 11/2004 | Tanaka | |
| 2006/0280669 A1 | 12/2006 | Jones | |
| 2007/0204512 A1 | 9/2007 | Self et al. | |
| 2007/0270513 A1 | 11/2007 | Leveson | |
| 2007/0286797 A1 | 12/2007 | Behrens et al. | |
| 2008/0040975 A1 | 2/2008 | Calderon | |
| 2008/0099377 A1 | 5/2008 | He et al. | |
| 2008/0155899 A1 | 7/2008 | Ramamurthy | |
| 2009/0077888 A1 | 3/2009 | Zander et al. | |
| 2009/0155434 A1 * | 6/2009 | Brunner | B01D 11/0403 426/387 |
| 2009/0206007 A1 | 8/2009 | Allam | |
| 2010/0043445 A1 | 2/2010 | Coronella | |
| 2010/0056767 A1 * | 3/2010 | Gunning | C07J 17/005 536/5 |
| 2010/0319255 A1 | 12/2010 | Struble | |
| 2011/0000825 A1 * | 1/2011 | McGrady | C10G 1/065 208/430 |
| 2011/0179799 A1 * | 7/2011 | Allam | F02C 3/22 110/297 |
| 2011/0180262 A1 | 7/2011 | O'Dowd | |
| 2011/0289843 A1 | 12/2011 | Jorgenson | |
| 2012/0053378 A1 | 3/2012 | O'Rear | |
| 2012/0088650 A1 * | 4/2012 | Hama | B01J 23/42 977/902 |
| 2012/0172622 A1 | 7/2012 | Kocal | |
| 2012/0181217 A1 | 7/2012 | Choi | |
| 2013/0025190 A1 | 1/2013 | Cheiky | |
| 2013/0199195 A1 | 8/2013 | Allam | |
| 2014/0275668 A1 | 9/2014 | Walter | |
| 2014/0275678 A1 | 9/2014 | Walter | |
| 2015/0141699 A1 | 5/2015 | Barger | |
| 2016/0160124 A1 * | 6/2016 | Strimling | C10B 27/06 202/110 |
| 2016/0272903 A1 | 9/2016 | Walter | |
| 2018/0273846 A1 | 9/2018 | Garcia-Perez | |
| 2018/0291275 A1 | 10/2018 | Goodrich | |
| 2019/0153325 A1 | 5/2019 | Garcia-Perez | |

FOREIGN PATENT DOCUMENTS

| | | |
|---|---|---|
| CN | 1320267 | 10/2001 |
| CN | 1420155 | 5/2003 |
| CN | 1410511 | 3/2005 |
| CN | 2906230 | 5/2007 |
| CN | 101100621 | 1/2008 |
| CN | 101284984 | 10/2008 |
| CN | 101323793 | 12/2011 |
| CN | 102395709 | 3/2012 |
| CN | 102460039 | 5/2012 |
| CN | 102876349 | 1/2013 |
| CN | 105925317 | 9/2016 |
| FR | 973678 | 2/1951 |
| JP | 52-068107 | 6/1977 |
| JP | 55-60588 | 5/1980 |
| JP | 2000273472 | 10/2000 |
| JP | 2001115174 | 4/2001 |
| JP | 2001181651 | 7/2001 |
| JP | 2006-104261 | 4/2006 |
| JP | 2010-529286 | 6/2007 |
| JP | 2010-121049 | 6/2010 |
| JP | 2011088964 | 5/2011 |
| WO | WO 81/00855 | 4/1981 |
| WO | WO 2009/015409 | 2/2009 |
| WO | WO 2012092644 | 7/2012 |
| WO | WO 2012/154270 | 11/2012 |
| WO | WO 2014152645 | 9/2014 |
| WO | WO 2016/043651 | 3/2016 |
| WO | WO 2017/023985 | 2/2017 |

OTHER PUBLICATIONS

Demirbas et al., "An Overview of Biomass Pyrolysis", Energy Sources, vol. 24, No. 3, 2002, pp. 471-482.
European Supplementary Search Report for EP14768189.4 dated Nov. 3, 2016, 9 pgs.
European Supplementary Search Report for EP14769519.1 dated Nov. 2, 2016, 9 pgs.
Evans et al., Renewable Hydrogen Production by Catalytic Steam Reforming of Peanut shells Pyrolysis Products, Fuel Chemistry Division Preprints, vol. 47, No. 2, Feb. 20, 1975, 2 pgs.
Fouga et al., Studies on Nuclear Hydrogen Production by Steam Coal gasification in Argentina, Jul. 17-19, 2017, 22 pgs.
Hojniak et al., Highly Selective Separation of Carbon Dioxide from Nitrogen and Methane by Nirtile/Glycol-Difunctionalized Ionic Liquid in Supported ionic Liquid membranes (SILMS). J. Phys. Chem. B, 2014, 118 (26) 7440-7449.
Kapoor A, Yang RT: Kinetic separation of methane-carbon dioxide mixture by adsorption on molecular sieve carbon. Chemical Engineering Science. vol. 44, 8, 1989, 1723-1733.
Kortlever et al., Electrochemical CO2 reduction to formic acid on a Pd-based formic acid oxidation catalyst. Catalysis Today. 244, 2015, 58-62.
Kortlever et al., Electrochemical CO2 Reduction to Formic acid at Low Overpotential and with High Faradaic Efficiency on Carbon-Supported Bimetallic Pd-Pt Nanoparticles. ACS Catal., 2015, 5 (7), pp. 3916-3923.
Moret et al., Direct Synthesis of formic acid from carbon dioxide by hydrogenation in acid media. Nature Communications 5, 2014, 8 pgs.
PCT International Preliminary no Patentability in International Application PCT/US2018/027110, dated Oct. 24, 2019, 15 pages.
PCT International Preliminary Report on Patentability and Written Opinion for PCT/US2014/027530; dated Sep. 24, 2015.
PCT International Preliminary Report on Patentability and Written Opinion for PCT/US2014/027572; dated Sep. 25, 2015.
PCT International Preliminary Report on Patentability in International Application PCT/US2018/024289, dated Oct. 3, 2019, 7 pages.
PCT International Search Report and Written Opinion in International Application PCT/US2018/027110, dated Aug. 29, 2018, 18 pages.
PCT International Search Report and Written Opinion of PCT/US2018/024289 dated Jun. 8, 2018, 8 pages.
PCT International Search Report; International App. No. PCT/US2014/027530; dated Aug. 8, 2014; 4 pages.
PCT International Search Report; International App. No. PCT/US2014/027572; dated Aug. 21, 2014; 3 pages.

(56) References Cited

OTHER PUBLICATIONS

PCTUS2014/027530 PCT International Search Report dated Aug. 8, 2014, 4 pgs.
PCTUS2014/027572 PCT International Search Report dated Aug. 21, 2014, 3 pgs.
Sircar S: Separation of Methane and Carbon Dioxide Gas Mixture by Pressure Swing Adsorption. Separation Science and Technology, vol. 23, 1988, 6-7, 12 pgs.
Songolzedeh M, Soleimani M, Ravanchi MT, Songolzadeh R: Carbon Diozide Separation from flue Gases: A technological review Emphasizing Reduction in Greenhouse Gas Emissions. The Scientific World Journal, 2014, 34 pgs.
Turbosystems Engineering Inc., Overview of Supercritical Water Oxidation (SCWO), http://www.turbosynthesis.com/summitresearch/sumscw1.htm, copyright 2002 Turbosystems Engineering Inc., 4 pgs.
Wang et al., Production of Hydrogen from Biomass by Catalytic Steam Reforming of Fast Pyrolysis Oils, Energy & Fuels 12, pp. 19-24, 1998.
Westerhof et al., "Effect of Temperature in Fluidized Bed Fast Pyrolysis of Biomass: Oil Quality Assessment in Test Units," Industrial & Engineering Chemistry Research, vol. 49 Issue 3 (2010), pp. 1160-1168.
Xu et al., The Role of Supercritical Water in Pyrolysis of Carbonaceous Compounds, Energy Fuels, 2013, 27(6), pp. 3148-3153, May 29, 2013.
European Summons to attend oral proceedings in Application 14769519.1, mailed Oct. 1, 2019, 7 pages.

\* cited by examiner

METHOD AND SYSTEM FOR PERFORMING THERMOCHEMICAL CONVERSION OF A CARBONACEOUS FEEDSTOCK TO A REACTION PRODUCT

CROSS-REFERENCE TO RELATED APPLICATION

The present application is related to and claims the benefit of the earliest available effective filing date(s) from the following listed application(s) (the "Related Applications") (e.g., claims earliest available priority dates for other than provisional patent applications or claims benefits under 35 USC § 119(e) for provisional patent applications, for any and all parent, grandparent, great-grandparent, etc. applications of the Related Application(s)).

Related Applications

For purposes of the USPTO extra-statutory requirements, the present application constitutes a regular (non-provisional) patent application of United States Provisional Patent Application entitled SYSTEMS AND METHODS FOR CONVERTING BIOMASS FEEDSTOCK TO REFINED PRODUCTS, naming JOSHUA C. WALTER and MANUEL GARCIA-PEREZ as inventors, filed Mar. 15, 2013, Application Ser. No. 61/794,121.

TECHNICAL FIELD

The present disclosure generally relates to the thermochemical conversion of a carbonaceous feedstock to a reaction product, and in particular, the thermochemical decomposition of the carbonaceous feedstock to a reaction product using thermal energy transferred from a selected heat source via a supercritical fluid thermally coupling the feedstock and a selected heat source.

BACKGROUND

Hydrothermal liquefaction is a process commonly used for the production of crude bio-oils from lignocellulosic materials and algae. In hydrothermal liquefaction, the thermochemical reactions generally occur in an aqueous environment at temperatures above 250° C. and pressures of approximately 3000 psi for approximately 2-3 hours. The oil produced via hydrothermal liquefaction is primarily formed by products of lignin depolymerization reactions. The products from cellulose and hemicelluloses are soluble in water and, as such, are lost in the aqueous phase. If not recovered, the water soluble organic compounds may contribute to pollution. Separation of the bio-oil from water generally involves distillation, which is an energy-intensive process. It is, therefore, desirable to provide a process and system that remedy the defects of the previously known methods.

SUMMARY

In one illustrative embodiment, an method includes, but is not limited to, generating thermal energy with at least one heat source; providing a volume of feedstock; providing a volume of supercritical fluid; transferring a portion of the generated thermal energy to the volume of supercritical fluid; transferring at least a portion of the generated thermal energy from the volume of supercritical fluid to the volume of feedstock; and performing a thermal decomposition process on the volume of feedstock with the thermal energy transferred from the volume of supercritical fluid to the volume of the feedstock in order to form at least one reaction product.

In one illustrative embodiment, an apparatus includes, but is not limited to, a thermochemical conversion system including at least one thermochemical reaction chamber for containing a volume of feedstock; and a thermal energy transfer system including a heat transfer element containing a volume of supercritical fluid in thermal communication with at least one heat source, the thermal energy transfer system arranged to selectably place the volume of supercritical fluid in thermal communication with at least a portion of the volume of feedstock contained within the at least one thermochemical reaction chamber in order to selectably transfer thermal energy from the at least one heat source to the at least a portion of the volume of feedstock contained within the at least one thermochemical reaction chamber, the at least one thermochemical reaction chamber configured to thermochemically convert at least a portion of the feedstock to at least one reaction product with the thermal energy transferred from the supercritical fluid.

In one illustrative embodiment, a system includes, but is not limited to, at least one heat source; a thermochemical conversion system including at least one thermochemical reaction chamber for containing a volume of feedstock; and a thermal energy transfer system including a heat transfer element containing a volume of supercritical fluid in thermal communication with at least one heat source, the thermal energy transfer system arranged to selectably place the volume of supercritical fluid in thermal communication with at least a portion of the volume of feedstock contained within the at least one thermochemical reaction chamber in order to selectably transfer thermal energy from the at least one heat source to the at least a portion of the volume of feedstock contained within the at least one thermochemical reaction chamber.

In addition to the foregoing, various other method and/or system and/or apparatus aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

DETAILED DESCRIPTION

Figure 1A:
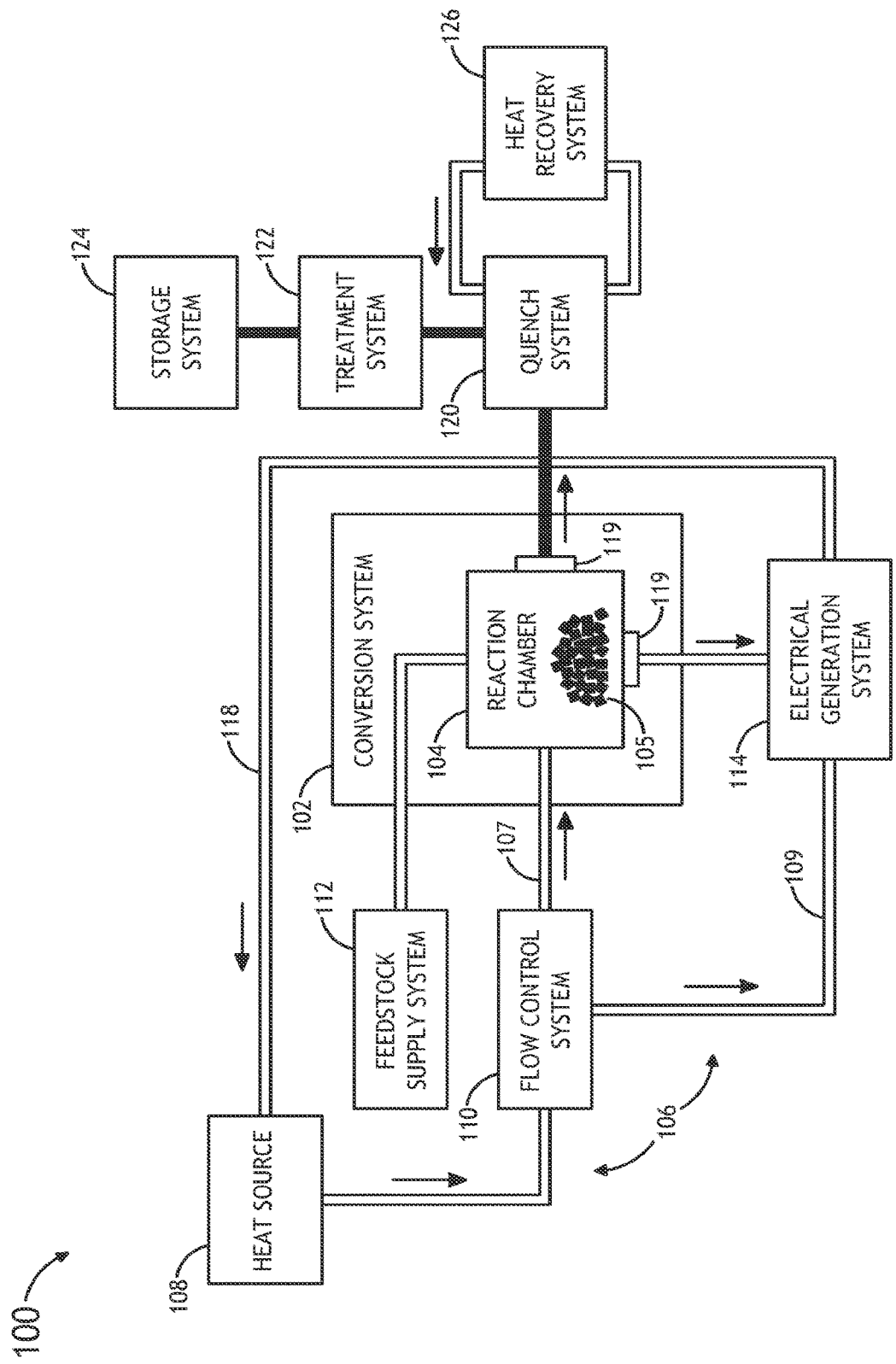
FIG. 1A is a block diagram view of a system for performing thermochemical conversion of a carbonaceous feedstock to a reaction product, in accordance with an illustrative embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Referring generally to FIGS. 1A through 1E, a system 100 for performing thermochemical conversion of a feedstock to a reaction product is described.

Figure 1B:
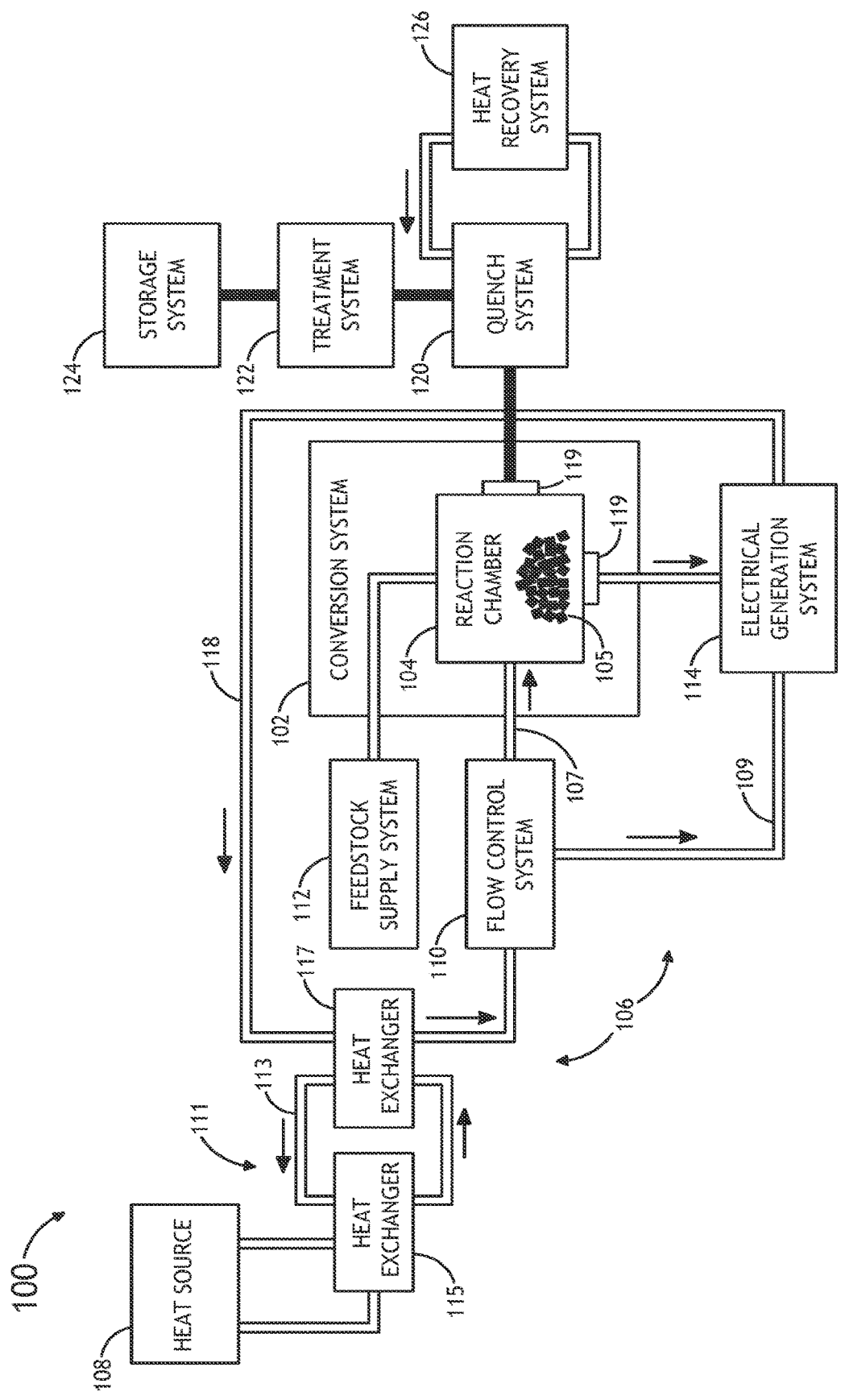
FIG. 1B is a block diagram view of a system for performing thermochemical conversion of a carbonaceous feedstock to a reaction product, in accordance with an illustrative embodiment.

FIGS. 1A and 1B illustrate a block diagram view of a system 100 for converting carbonaceous material to one or more reaction products. In one embodiment, the system 100 includes a thermochemical conversion system 102. In one embodiment, the thermochemical conversion system 102 includes a thermochemical reaction chamber 104, such as a pyrolysis reaction chamber, suitable for containing a volume of feedstock material 105 (e.g., carbonaceous material) and converting the feedstock material to one or more reaction products, such as, but not limited to, gas, oil or tar.

In another embodiment, the system 100 includes one or more heat sources 108. In another embodiment, the system 100 includes a thermal energy transfer system 106 for transferring thermal energy from the one or more heat sources 108 to the volume of feedstock 105 contained within the thermochemical reaction chamber 104. In one embodiment, the thermal energy transfer system 106 includes a heat transfer element 107 containing a volume of supercritical fluid in thermal communication (e.g., direct or indirect thermal communication) with the one or more heat sources. For example, the heat transfer element 107 may include, but is not limited to, a heat transfer loop, a heat transfer line and the like. For instance, the heat transfer element 107 may include, but is not limited to, a heat transfer loop filled with a supercritical fluid (e.g., super critical carbon dioxide) placed in thermal communication (e.g., directly or indirectly) with one or more portions of the one or more heat sources 108.

In one embodiment, the thermal energy transfer system is arranged to selectably place the volume of the supercritical fluid in thermal communication with the volume of feedstock contained within the thermochemical reaction chamber. In this regard, the thermal energy transfer system 106 may selectably transfer thermal energy from the one or more heat sources 108 to the volume of feedstock 105 contained within the at least one thermochemical reaction chamber 104. In another embodiment, the thermochemical reaction chamber 104 may thermochemically convert (e.g., convert via pyrolysis, convert via liquefaction or the like) at least a portion of the feedstock 105 to one or more reaction products using the thermal energy carried to the feedstock via the supercritical fluid.

The supercritical fluid of system 100 may include any supercritical fluid known in the art suitable for transferring energy from the one or more heat sources 108 to the feedstock 105 contained in the thermochemical reaction chamber 104. In one embodiment, the supercritical fluid includes, but is not limited to, supercritical carbon dioxide. In another embodiment, the supercritical fluid includes, but is not limited to, water, methanol, ethanol, propanol, acetone. In another embodiment, the supercritical fluid is pressurized to high pressure within at least one of the heat transfer element 107 and the thermochemical reaction chamber 104.

It is noted herein that the supercritical fluid of system 100, such as, but not limited to $CO_2$, may have low viscosity and surface tension, allowing such supercritical fluids to readily penetrate organic materials (e.g., biomass material). The penetration of the supercritical fluid into the feedstock 105 reduces the need for converting the feedstock 105 into fine particles prior to thermochemical reaction, thereby saving energy in the reaction of the feedstock material. In one embodiment, in case where the supercritical fluid is supercritical $CO_2$, the supercritical fluid may be pressurized to above its critical pressure (72.9 atm) and critical temperature (304 K). It is noted herein that above these conditions, $CO_2$, will display unique solvency properties, similar to organic solvents such as hexane, methanol and ethanol. The non-polar nature of supercritical $CO_2$ may facilitate the control of undesirable ionic secondary reactions that commonly occur in aqueous environments. Further, $CO_2$ will volatize when the system is depressurized below the critical conditions, which facilitates the recovery of oil with low content of water. Again, this may significantly reduce energy consumption during reaction product-supercritical fluid separation, described further herein, following liquefaction and/or pyrolysis. It is further noted herein that liquefaction implement via the supercritical fluid of system 100 applies heated and pressurized $CO_2$ to the feedstock material 105, which provides for better control of reaction conditions (e.g., time, pressure, and temperature), thereby allowing for better selectivity of high-value targeted chemical compounds or fuel intermediates.

In another embodiment, a supercritical fluid, such as supercritical $CO_2$, may provide strong temperature and reaction time control via the injection of cooler supercritical fluid into the thermochemical reaction chamber 104 to quench the reaction or hotter supercritical fluid to accelerate the reaction. It is further recognized that since a number of supercritical fluids, such as supercritical CO2, can be efficiently compressed, pressure conditions within the thermochemical reaction chamber 104 may also be used to control thermochemical reactions within the thermochemical reaction chamber 104.

It is further noted herein that the supercritical fluid may be utilized to dry the feedstock 105 prior to liquefaction and/or pyrolysis. For example, in the case where the supercritical fluid is $sCO_2$, prior to liquefaction and/or pyrolysis, the supercritical fluid may serve to dry the feedstock material 105 to remove excess water and impurities. It is further noted herein that the drying of the feedstock may reduce the amount of hydrogen needed for hydrotreating and/or hydrocracking the one or more reaction products.

In another embodiment, the solubility of one or more reaction products, such as bio-oil, in the supercritical fluid are controlled by adding or removing a polar material into the supercritical fluid. For example, the solubility of one or more oils in supercritical carbon dioxide may be controlled by the addition/removal of one or more materials including a polar molecule, such as, but not limited to, $H_2$, $H_2O$, an alcohol and the like. By way of another example, in the case where the feedstock material includes coal, the solubility of one or more oils in supercritical $CO_2$ may be controlled by adding/removing one or more materials including a hydrogen donor molecule, such as, but is not limited to, $H_2$, $H_2O$ and any other hydrogen donor solvents known in the art.

It is recognized herein that feedstock 105 contained within the thermochemical reaction chamber 104 may include sufficient moisture and polar nature to adequately dissolve the one or more reaction products (e.g., bio-oil) in the supercritical fluid. As discussed further herein, the 'dryness' of the feedstock may be controlled by the thermochemical conversion system 102 (e.g., controlled via dryer 134), allowing the thermochemical conversion system 102 to maintain a moisture content level within the feedstock 105 to a level sufficient for adequately dissolving one or more reaction products in the supercritical fluid.

In another embodiment, the supercritical fluid may contain one or more materials for enhancing one or more physical or thermochemical reactions in the system 100. For example, the supercritical fluid may contain one or more catalysts, such as, but not limited to, metals, metal salts and organics. By way of another example, the supercritical fluid may contain one or more solutes, such as, but not limited to, alcohols, oils, hydrogen and hydrocarbons.

The one or more heat sources 108 may include any heat source known in the art suitable for providing thermal energy sufficient to heat the feedstock 105 to the selected temperature (e.g., temperature adequate for fast pyrolysis (e.g., 350-600° C.).

In one embodiment, the one or more heat sources 108 include a non-$CO_2$ emitting heat source. In one embodiment, the one or more heat sources 108 include one or more nuclear reactors. The one or more heat sources 108 may include any nuclear reactor known in the art. For example, the one or more heat sources 108 may include a liquid metal cooled nuclear reactor, a molten salt cooled nuclear reactor, a high temperature water cooled nuclear reactor, a gas cooled nuclear reactor and the like. By way of another example, the one or more heat sources 108 may include a pool reactor. By way of another example, the one or more heat sources 108 may include a modular reactor.

It is recognized herein that a nuclear reactor may generate temperatures sufficient to carry out pyrolysis (e.g., fast pyrolysis) of feedstock 105. For example, a nuclear reactor heat source may generate temperatures in excess of 350-600° C. In this regard, a nuclear reactor may be used to transfer thermal energy (e.g., at a temperature in excess of 350-600° C.) to the supercritical fluid (e.g., supercritical $CO_2$). In turn, the supercritical fluid may transfer the nuclear reactor generated thermal energy to the feedstock 105 contained within the thermochemical reaction chamber 104.

It is further noted herein that a nuclear reactor heat source is particularly advantageous as a heat source in the context of system 100 because the thermochemical reaction temperatures of system 100 are within the range of operating temperatures for many nuclear reactors. Nuclear reactor heat may be used to create reaction products (e.g., bio-oil) in the thermochemical reaction chamber 104 at high efficiency since the nuclear reactor is operating at the reaction temperature for the thermochemical conversion (i.e., heat added at the thermochemical reaction temperature supplies the required reaction enthalpy).

In one embodiment, the supercritical fluid of system 100 serves as a safety mechanism in the operation of the nuclear reactor driven thermochemical conversion system 112 of system 100. By way of example, supercritical carbon dioxide may be stored in one or more reservoirs (not shown) or tanks (not shown). It is noted herein that supercritical carbon dioxide stored in this in this manner may be used to provide a thermal buffer between the reactor and the thermochemical conversion system 102 by acting as a thermal dashpot. In another embodiment, the supercritical fluid may be stored at temperatures and pressures suitable for discharge into the thermomechanical rotating machinery, such as a turbine. In this manner, a selected amount of work may be developed by the compressed $CO_2$ to provide mechanical or electric power to safety systems, such as flow valves, safety valves, isolation valves, pumps, and the like.

In one embodiment, as shown in FIG. 1A, the thermal energy transfer system 106 includes a direct heat exchange system configured to transfer thermal energy directly from the one or more heat sources 108 to the volume of the supercritical fluid of the heat transfer element 107. For example, the heat transfer element 107 may be placed in direct thermal communication with a portion of the one or more heat sources 108. For instance, in the case where the one or more heat sources 108 includes a nuclear reactor, one or more coolant systems of the nuclear reactor may be integrated with the thermal energy transfer system 106. In this regard, the nuclear reactor may utilize a supercritical fluid in one or more coolant systems, which may then be coupled directly to the thermochemical reaction chamber 104. For example, a primary or intermediate coolant loop of the nuclear reactor may include a coolant fluid consisting of a supercritical fluid, such as supercritical $CO_2$. Further, the coolant loop of the nuclear reactor may be directly coupled to the thermochemical reaction chamber 104 via the thermal energy transfer system 106 so as to intermix the supercritical fluid of the coolant loop of the nuclear reactor with the feedstock material 105 contained within the thermochemical reaction chamber 104. In turn, upon transferring thermal energy from the nuclear reactor to the feedstock material 105, the thermal energy transfer system 106 may circulate the supercritical fluid coolant back to the nuclear reactor via return path 118. It is further contemplated herein that the thermal energy transfer system 106 may include any number of filtration elements in order to avoid transfer of feedstock and/or reaction products to the coolant system(s) of the nuclear reactor.

In another embodiment, as shown in FIG. 1B, the thermal energy transfer system 106 includes an indirect heat exchange system. In one embodiment, the indirect heat exchange system is configured to indirectly transfer thermal energy from the one or more heat sources 108 to the volume of the supercritical fluid contained within the heat transfer element 107. In one embodiment, the indirect heat exchange system includes an intermediate heat transfer element 111 configured to transfer thermal energy from the one or more heat source 108 to the intermediate heat transfer element 111. In turn, the intermediate heat transfer element 111 may transfer thermal energy from the intermediate heat transfer element 111 to the volume of the supercritical fluid contained within the heat transfer element 107.

In one embodiment, the intermediate heat transfer element 111 may include an intermediate heat transfer loop 113, and one or more heat exchangers 115, 117. In one embodiment, the intermediate heat transfer loop 113 may include any working fluid known in the art suitable for transferring thermal energy. For example, the working fluid of the intermediate heat transfer loop 113 may include, but is not limited to, a liquid salt, a liquid metal, a gas, a supercritical fluid (e.g., supercritical $CO_2$) or water.

In another embodiment, the intermediate heat transfer element 111 may include a first heat exchanger 115 in thermal communication with a portion of the one or more heat sources 108 and the intermediate heat transfer loop 113. In another embodiment, the indirect heat exchange system 111 may include a second heat exchanger 117 in thermal communication with the intermediate heat transfer loop 113 and the heat transfer element 107. For example, in the case where the one or more heat sources 108 include a nuclear reactor, one or more coolant systems (e.g., primary, intermediate or ternary) of the nuclear reactor (e.g., a molten salt cooled nuclear reactor, a liquid metal cooled reactor, a gas cooled reactor or and a supercritical fluid cooled reactor) may be coupled to the intermediate heat transfer loop 113 via a first exchanger 115. In turn, upon transferring thermal energy from the nuclear reactor to the intermediate heat transfer loop 113 via the first heat exchanger 115, the intermediate heat transfer loop 113 may transfer the nuclear reactor generated thermal energy from the intermediate transfer loop 113 to the supercritical fluid contained within the heat transfer element 107 via a second heat exchanger 117.

Further, as described previously herein, the heat transfer element 107 of the heat transfer system 106 may intermix the supercritical fluid contained within the heat transfer element 107 with the feedstock material 105 contained within the thermochemical reaction chamber 104. In turn, upon transferring thermal energy from the nuclear reactor to the feedstock material 105 via the intermediate heat transfer system 111 and the heat transfer element 107, the thermal energy transfer system 106 may re-circulate the supercritical fluid coolant via return path 118.

It is noted herein that the above description of the direct and indirect coupling between the one or more heat sources 108 and the feedstock 105 is not limiting and is provided merely for illustrative purposes. It is recognized herein that in a general sense the integration between the one or more heat sources (e.g., nuclear reactor) and the thermochemical reaction chamber 104 may occur by transferring heat from a primary, intermediate, or ternary heat transfer system (e.g., coolant system) of the one or more heat sources 108 to the working fluid, such as supercritical $CO_2$, of the thermochemical conversion system 102. It is further recognized herein that this integration may be carried out using any heat transfer systems or devices known in the art, such as, but not limited to, one or more heat transfer circuits, one or more heat sinks, one or more heat exchangers and the like.

In one embodiment, the thermal energy transfer system 106 includes a flow control system 110. The flow control system 110 may be arranged to selectably place the supercritical fluid in thermal communication with the volume of feedstock contained within the thermochemical reaction chamber 104. In this regard, the flow control system 110 may selectably transfer thermal energy from the one or more heat sources 108 to the volume of feedstock contained within thermochemical reaction chamber 104. For example, the flow control system 110 may be positioned along the heat transfer element 107 (e.g., heat transfer loop) in order to control the flow of supercritical fluid through the heat transfer element 107. In this regard, the flow control system 110 may control the flow of the supercritical fluid to the volume of feedstock 105, thereby controlling the transfer of thermal energy to the feedstock 105.

The flow control system 110 may include any flow control system known in the art suitable for controlling supercritical fluid flow from a first position to a second position. For example, the flow control system 110 may include, but is not limited to, to one or more control valves operably coupled to the heat transfer element 107 and suitable for establishing and stopping flow through the heat transfer element 107. For instance, the flow control system 110 may include a manually controlled valve, a valve/valve actuator and the like.

In another embodiment, the flow control system 110 may couple the thermal energy from the one or more heat sources 108 to the electrical generation system 114. For example, the flow control system 110 may establish a parallel coupling of heat source 108 generated heat to a turbine electric system and the thermochemical conversion system 102. In one embodiment, the thermochemical conversion system 102 may include multiple batch-type reaction systems, which may receive heat from the one or more heat sources 108 (e.g., nuclear reactor). In this manner, it is possible to run multiple batch processes, concurrently or sequentially, which address overall thermal and feedstock conversion needs. In another embodiment, heat may be transferred to one or more continuous thermochemical reactors while being coupled in parallel to one or more turbine electric system.

In one embodiment, the system 100 includes a feedstock supply system 112. In one embodiment, the feedstock supply system 112 is operably coupled to the thermochemical reaction chamber 104 of the thermochemical conversion system 102. In another embodiment, the feedstock supply system 112 provides a volume of feedstock material 105 to the interior of the thermochemical reaction chamber 104. The feedstock supply system 112 may include any supply system known in the art suitable for translating a selected amount of feedstock material, such as solid material, particulate material or liquid material, from one or more feedstock sources to the interior of the thermochemical reaction chamber 104. For example, the feedstock supply system 112 may include, but not limited, to a conveyor system, a fluid transfer system and the like.

The feedstock material 105 may include any carbonaceous material known in the art. For example, the feedstock material 105 may include, but is not limited to, coal, biomass, mixed-source biomaterial, peat, tar, plastic, refuse, and landfill waste. For example, in the case of coal, the feedstock may include, but is not limited to, bituminous coal, sub-bituminous coal, lignite, anthracite and the like. By way of another example, in the case of biomass, the feedstock may include a wood material, such as, but not limited to, softwoods or hardwoods.

It is noted herein that the ability to control temperature, pressure, reaction time, pre-treatment options, and post organic-product production options may allow for multiple types of carbonaceous feedstock to be utilized within the system 100. In addition, the ability to co-utilize or switch between types of feedstock may improve the utilization of available resources and improve the overall system economics. In some embodiments, it may be useful to place non-bio-derived products into the thermochemical reaction chamber 10 for thermochemical conversion. For example, this may include the conversion of materials, such as plastics, into alternative products or fuels. By way of another example, the thermochemical reaction chamber 104 may thermochemically process a combination of feedstock materials may be to form one or more reaction products or alternative products. For instance, the thermochemical reaction chamber 104 may thermochemically convert a volume of feedstock consisting of a combination of plastic(s) and cellulosic material. By way of another example, the thermochemical reaction chamber 104 thermochemically process or convert mixed sources of materials, or mixed wastes, such as refuse or landfill wastes, to one or more reaction products or alternative products.

Referring again to FIGS. 1A and 1B, the thermochemical conversion system 102 includes any thermochemical reaction chamber 104 suitable for carrying out one or more thermal decomposition processes know in the art.

In one embodiment, the thermochemical reaction chamber 104 is configured to carry out a pyrolysis reaction on the feedstock 105. In another embodiment, the thermochemical reaction chamber 104 includes a pyrolysis chamber. In another embodiment, the thermochemical reaction chamber 104 includes a non-combustion or low-combustion pyrolysis chamber. The pyrolysis chamber of system 100 may encompass any thermochemical reaction chamber suitable for carrying out the thermochemical decomposition of organic molecules in the absence of oxygen or in a low oxygen environment.

In one embodiment, the thermochemical reaction chamber 104 includes a fast pyrolysis reactor suitable for converting feedstock 105, such as biomass, to a reaction product, such as bio-oil (e.g., bio-oil which may be further uprated to produce liquid fuel), volatile gas or char. A fast pyrolysis reactor may include any thermochemical reaction chamber capable of carrying out a thermochemical decomposition of organic molecules in the absence of oxygen (or in a reduced oxygen environment) within approximately two seconds. Fast pyrolysis is generally described by Roel J. M. Westerhof et al. in "Effect of Temperature in Fluidized Bed Fast Pyrolysis of Biomass: Oil Quality Assessment in Test Units," *Industrial & Engineering Chemistry Research*, Volume 49 Issue 3 (2010), pp. 1160-1168, which is incorporated herein by reference in the entirety. Pyrolysis and fast pyrolysis are also generally described by Ayhan Demirbas et al. in "An Overview of Biomass Pyrolysis," *Energy Sources*, Volume 24 Issue 3 (2002), pp. 471-482, which is incorporated herein by reference in the entirety.

In another embodiment, the thermochemical reaction chamber 104 includes a supercritical pyrolysis reactor suitable for converting feedstock 105, such as biomass, to a reaction product, such as bio-oil (e.g., bio-oil which may be further uprated to produce liquid fuel), volatile gas or char. For the purposes of the present disclosure, a 'supercritical pyrolysis reactor' is interpreted to encompass any reactor, reaction vessel or reaction chamber suitable for carrying out a pyrolysis reaction of feedstock material using the thermal energy supplied from a supercritical fluid. In another embodiment, the thermochemical reaction chamber 104 may include, but is not limited to, a fluidized bed reactor.

Combustion of feedstock may be avoided, or at least reduced, by employing an external heat source (e.g., heat source 108), such as a nuclear reactor, to supply thermal energy to drive the pyrolysis reaction (or any other thermal decomposition process) of system 100. Further, as noted previously herein, the use of a supercritical fluid, such as supercritical $CO_2$, may drive pyrolysis in the feedstock material without generating excessive temperatures commonly associated with combustion-driven pyrolysis reactions, which commonly yield char, resulting in lighter, aromatic, hydrocarbons, which reduce the conversion efficiency of the oil product.

In one embodiment, the thermochemical reaction chamber 104 may include a pyrolysis reaction chamber (e.g., fast pyrolysis reactor or supercritical pyrolysis reactor) for thermally decomposing the feedstock 105 into one or more reaction products, at a temperature between 350° and 600° C., using the thermal energy transferred from the volume of supercritical fluid contained within the heat transfer element 105. For example, the thermochemical reaction chamber 104 may include a fast pyrolysis reaction chamber for thermally decomposing the feedstock 105 at a temperature between approximately 350° and 600° C. using the thermal energy transferred from a nuclear reactor via the volume of supercritical fluid contained within the heat transfer element 107. By way of another example, the thermochemical reaction chamber 104 may include, but is not limited to, a supercritical pyrolysis reactor for thermally decomposing the feedstock 105 at a temperature of between approximately 350° and 600° C. using the thermal energy transferred from a nuclear reactor via the volume of supercritical fluid contained within the heat transfer element 105.

In another embodiment, the thermochemical reaction chamber 104 is configured to carry out a liquefaction process on the feedstock 105. Those skilled in the art will recognize that liquefaction may generally include a sequence of structural and chemical processes leading to the general breakdown of complex organic materials (such as carbonaceous biomass material) to products, such as bio-oil. Liquefaction may include, but is not limited to, solvolysis, depolymerization, thermal decomposition, hydrogenolysis and/or hydrogenation. Liquefaction of biomass is generally described by Ralph P. Overend et al. (eds.) in "Biomass Liquefaction: An Overview," *Fundamentals of Thermochemical Biomass Conversion*, Elsevier Applied Science Publishers LTD., 1985, pp. 967-1002, which is incorporated herein by reference in the entirety.

In another embodiment, the thermochemical reaction chamber 104 includes a liquefaction chamber for implementing a liquefaction process on the feedstock 105 using the thermal energy supplied to the thermochemical reaction chamber 104 via the supercritical fluid from heat transfer element 107. By way of example, the thermochemical reaction chamber 104 may include, but is not limited to, a supercritical liquefaction reactor. For the purposes of the present disclosure, a 'supercritical liquefaction reactor' is interpreted to encompass any reactor, reaction vessel or reaction chamber suitable for carrying out a liquefaction process on the feedstock material using the supercritical fluid.

As noted previously herein, some supercritical fluids, such as supercritical CO2, display low viscosity and surface tension, which allow these supercritical fluids to penetrate organic materials. It is further noted herein that the penetration of organic materials by a given supercritical fluid may reduce the need for converting the biomass into fine particles for reaction, thereby reducing energy consumption in the reaction of the feedstock material.

In one embodiment, the thermochemical reaction chamber 104 includes a liquefaction chamber for implementing a high temperature liquefaction process on the feedstock 105 in the presence of the supercritical fluid (e.g., supercritical $CO_2$). In one embodiment, the supercritical fluid needed for the supercritical fluid liquefaction is transferred to the feedstock 105 by intermixing the supercritical fluid with the feedstock 105 in the thermochemical reaction chamber 104. The supercritical fluid supplies both heat transfer to the feedstock material 105 and physical interaction with the feedstock material at the cellular level. In one embodiment, the thermochemical reaction chamber 104 may carry out the liquefaction process on the feedstock 105 in the presence of the supercritical fluid at a temperature in the range 300° to 500° C.

In one embodiment, the thermochemical reaction chamber 104 may carry out a liquefaction step including the deconstruction of cellulosic material of a feedstock material (e.g., biomass feedstock material). It is noted herein that this cellulosic deconstruction provides for improved access to inner sugars of the feedstock material, while also de-convoluting lignin and hemicellulose chains in the feedstock material. It is further noted herein that cellulosic breakdown of feedstock material may be carried out using the supercritical fluid supplied to the feedstock material. In the case of supercritical $CO_2$, the $CO_2$ may expand the cellular structure of the feedstock material until the cells walls of the material are destroyed or the cellulosic material begins to rip. In this regard, supercritical $CO_2$, which is soluble in water, may diffuse through pores in the lignocellulosic biomass and selectively react with non-polar components of the biomass material, such as hydrocarbons. The sudden expansion of the $CO_2$, which may be trapped in the pores of the lignocellulosic biomass, may then lead to the deconstruction of the biomass. Further, this process may also lead to the deconvolution of fundamental molecules, such as lignin and hemicellulosic chains in the feedstock.

In another embodiment, the thermochemical reaction chamber 104 may carry out a liquefaction step including depolymerization. For example, the depolymerization may lead to the breakdown of fundamental molecules, such as, but not limited to, lignin or hemicellulose in the feedstock material 105 (or intermediate products from the feedstock material). For instance, the depolymerization-based liquefaction of system 100 may cause molecule-to-molecule breakdown or breakdown of various molecular groups from given molecules in the feedstock (or intermediate products).

In another embodiment, the thermochemical reaction chamber 104 may carry out a liquefaction step including thermal decomposition. For example, the thermal decomposition of the feedstock (or intermediate products) may lead to fracturing across inter-molecular bonds (e.g., carbon-carbon bonds are fractured) within the molecules of the feedstock material (or intermediate products).

In another embodiment, the thermochemical reaction chamber 104 may carry out one or more extraction processes on the feedstock (or intermediate products) in conjunction with liquefaction. In another embodiment, an extraction chamber operably coupled to the thermochemical reaction chamber 104 may carry out one or more extraction processes on the feedstock (or intermediate products) in conjunction with liquefaction. In one embodiment, the thermochemical reaction chamber 104 is configured to remove additional compounds from the feedstock material prior to pyrolysis. For example, the thermochemical reaction chamber 104 may be configured to remove at least one of oils and lipids, sugars, or other oxygenated compounds. In another embodiment, the extracted compounds may be collected and stored for the development of additional bio-derived products.

It is noted herein that it is particularly advantageous to remove sugars from the feedstock material 105. It is recognized herein that sugars caramelize at elevated temperature and may act to block the supercritical fluid, such as supercritical $CO_2$, from entering the cellulose structure of the feedstock material 105. In addition, sugars present in the thermochemical conversion system 102 may also act to harm downstream catalyst beds (if any). It is noted herein that the removal of sugars aids in avoiding the formation of oxygenated compounds such as, but not limited to, furfural, hydroxymethalfurfural, vanillin and the like.

In one embodiment, the thermochemical conversion system 102 may extract materials from the feedstock 105 at temperatures below 200° C. It is noted herein that it is beneficial to extract sugars at temperatures below 200° C. as fructose, sucrose and maltose each caramelize at temperatures below approximately 180° C. In this regard, the supercritical fluid, through the deconstruction of cellulosic material and the sweeping away of sugars, may serve to extract sugars from the feedstock 105 prior to the elevation of temperatures during pyrolysis.

In another embodiment, the thermochemical reaction chamber 104 may carry out a liquefaction step including hydrogenation. It is noted herein that during liquefaction hydrogenation may serve to heal frayed molecular bonds within the one or more reaction products, such as bio-oil, thereby stabilizing the one or more reaction products.

In another embodiment, the thermochemical reaction chamber 104 is configured to dry the feedstock 105 to a selected dryness level prior to thermal decomposition. In another embodiment, a dryer operably coupled to the thermochemical reaction chamber 104 is configured to dry the feedstock 105 to a selected dryness level prior to thermal decomposition. For example, the thermochemical reaction chamber 104 (or the dryer) may utilize the supercritical fluid to dry the feedstock 105 to a selected level. For example, the thermochemical reaction chamber 104 may dry the feedstock 105 to a 5.0 to 15.0% moisture content level. By way of another example, the thermochemical reaction chamber 104 may control the moisture content, such that some amount of moisture remains in the feedstock 105 material. For instance, in the case of pine wood, the thermochemical reaction chamber 104 may vary the moisture content level from approximately 7.0 to 55%.

In another embodiment, the thermochemical reaction chamber 104 is configured to pre-heat the feedstock 105 prior to thermal decomposition. In another embodiment, a pre-heating chamber 104 operably coupled to the thermochemical reaction chamber 104 is configured to pre-heat the feedstock 105 prior to thermal decomposition. For example, the thermochemical reaction chamber 104 (or the pre-heating chamber) may pre-heat the feedstock material to a temperature at or near the temperature necessary for liquefaction and/or pyrolysis.

In another embodiment, the thermochemical reaction chamber 104 is configured to pre-treat the feedstock 105 prior to thermal decomposition. For example, the thermochemical reaction chamber 104 may pre-hydrotreat the feedstock material with hydrogen prior to liquefaction and/or pyrolysis. For instance, pre-treating the feedstock material with hydrogen may aid in removing materials such as, but not limited to, sulfur, as well as serving to donate hydrogen to broken dangling bonds (i.e., stabilizing free radicals).

Figure 1C:
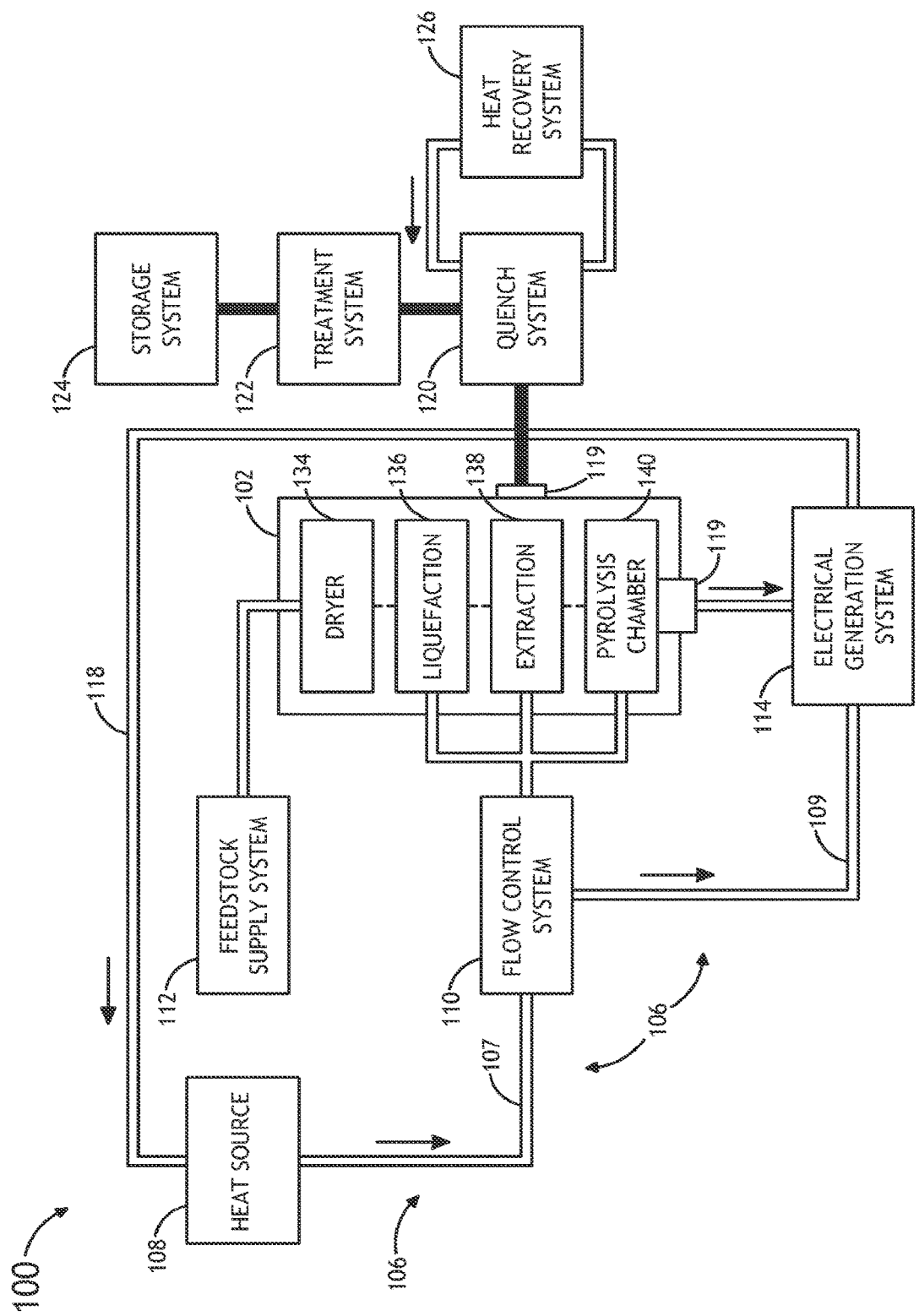
FIG. 1C is a block diagram view of a system for performing thermochemical conversion of a carbonaceous feedstock to a reaction product, in accordance with an illustrative embodiment.

FIG. 1C illustrates a thermochemical conversion system 102 equipped with multiple process chambers for carrying out the various steps of the multi-stage thermochemical process of system 100. In one embodiment, the thermochemical conversion system includes a dedicated dryer/pre-heater 134, a liquefaction chamber 136, an extraction chamber 138 and a pyrolysis chamber 140.

Applicants note that while the above description points out that in some embodiments the pyrolysis reaction chamber, liquefaction chamber, the extraction chamber, and/or the dryer/pre-heater may exist as separate chambers, this should not be interpreted as a limitation. Rather, it is contemplated herein that two or more of the thermochemical steps may each be carried out in a single reaction chamber.

In one embodiment, the thermochemical reaction chamber 104 includes a multi-stage single thermochemical reaction chamber. In one embodiment, the thermal energy transfer system 102 is configured to transfer multiple portions of the supercritical fluid across multiple temperature ranges to the volume of feedstock 105 contained within the multi-stage single thermochemical reaction chamber 104 to perform a set of thermochemical reaction processes on the at least a portion of the volume of feedstock.

In another embodiment, the thermal energy transfer system 102 is configured to transfer a first portion of the supercritical fluid in a first temperature range to the volume of feedstock 105 contained within the single thermochemical reaction chamber 104 to perform a drying process on the at least a portion of the volume of feedstock.

In another embodiment, the thermal energy transfer system 102 is configured to transfer a second portion of the supercritical fluid in a second temperature range to the volume of feedstock 105 contained within the single thermochemical reaction chamber 104 to perform a pre-heating process on the at least a portion of the volume of feedstock.

In another embodiment, the thermal energy transfer system 102 is configured to supply a third portion of the supercritical fluid in a second temperature range to the volume of feedstock 105 contained within the single thermochemical reaction chamber 104 to perform a liquefaction process on the at least a portion of the volume of feedstock.

In another embodiment, the thermal energy transfer system 102 is configured to supply a fourth portion of the supercritical fluid in a fourth temperature range to the volume of feedstock 105 contained within the single thermochemical reaction chamber 104 to perform an extraction process on the at least a portion of the volume of feedstock to remove at least one oxygenated compound from the at least a portion of the feedstock.

In another embodiment, the thermal energy transfer system 102 is configured to supply a fifth portion of the supercritical fluid in a fifth temperature range to the volume of feedstock 105 contained within the single thermochemical reaction chamber 104 to perform a pyrolysis process on the at least a portion of the volume of feedstock In one embodiment, the flow and temperature of the supercritical fluid (e.g., supercritical CO2) are varied spatially across the thermochemical reaction chamber 104. For example, in order to vary flow and/or temperature across the reaction chamber 104, multiple flows of supercritical fluid, each at a different temperature, may be established prior to entering the single reaction chamber. In this regard, in a vertical reaction chamber, the flow rate and temperature at a number of spatial locations, corresponding to the various thermochemical stages, may be varied. By way of another example, the temperature of the supercritical fluid may be varied along the length of the thermochemical reaction chamber 104 by flowing the supercritical fluid along the length of the thermochemical reaction chamber 104. For instance, a flow of low temperature supercritical $CO_2$ may be combined with a flow of $CO_2$ at a higher temperature (e.g., between 70° to 150° C.) to dissolve sugars. At another point downstream (e.g., 1-3 meters downstream with an average flow rate of 0.25-4 m/s), supercritical $CO_2$ at or above pyrolysis temperatures (e.g., above 500° C.) is mixed into the chamber. By staging the temperatures of the various thermochemical reaction steps according to length, the flow rate may be used to control reaction times.

It is further contemplated that two or more thermochemical steps, such as pyrolysis, liquefaction and extraction, are carried out in the thermochemical chamber 104, while additional steps, such as drying and pre-heating are carried out in a dedicated chamber operably coupled to the thermochemical reaction chamber 104.

Referring to FIGS. 1A-1E, the system 100 includes a separation unit 113, in accordance with one or more embodiments of system 100. In one embodiment, the separator unit 119 is operably coupled to the thermochemical reaction chamber 104 and arranged to separate one or more materials from the supercritical fluid exiting the thermochemical reaction chamber 104. For example, the separator unit 119 may be placed in fluidic communication with an outlet of the thermochemical reaction chamber 104 and configured to separate one or more reaction products (resulting from the thermochemical decomposition of feedstock material) from the supercritical fluid exiting the thermochemical reaction chamber 104.

In one embodiment, the separator unit 119 includes a solubility controller. For example, the solubility controller may be configured to control a solubility parameter of one or more reaction products contained within the supercritical fluid following thermochemical reaction of the feedstock material 105. In one embodiment, the solubility controller may be configured to change the pressure via a pressure control element, thereby controlling the solubility of the reaction products in the supercritical fluid. For example, the supercritical fluid (e.g., supercritical $CO_2$) may be expanded (e.g., expanded in expansion chamber) to a lower pressure supercritical state, a liquid state, or a gaseous states in order to remove and separation dissolved or entrained in the supercritical fluid. For instance, bio-oil or a hydrotreated product may be extracted from the volume of supercritical fluid by reducing the pressure of the supercritical fluid, causing the bio-oil or hydrotreated product to fall out of the supercritical fluid. It is noted herein that it may be possible to change the pressure of the supercritical fluid without causing the fluid to leave the supercritical state.

In another embodiment, the solubility controller may be configured to change the temperature via a temperature control element (e.g., heating/cooling element) of the supercritical fluid, thereby controlling the solubility of the reaction products in the supercritical fluid. For instance, bio-oil or a hydrotreated product may be extracted from the volume of supercritical fluid by changing the temperature of the supercritical fluid, causing the bio-oil or hydrotreated product to fall out of the supercritical fluid.

In another embodiment, the solubility controller may be configured to change the solvent concentration of the supercritical fluid, thereby controlling the solubility of the reaction products in the supercritical fluid.

In another embodiment, the solubility controller may control the solubility of one or more reaction products, such as bio-oil, in the supercritical fluid by adding or removing a polar material into the supercritical fluid. For example, the solubility of one or more oils in supercritical carbon dioxide may be controlled by the addition/removal of one or more materials including a polar molecule. For instance, the polar molecules may include, but are not limited to, $H_2$, $H_2O$, alcohols and the like. By way of another example, in the case where the feedstock material includes coal, the solubility of one or more oils in supercritical $CO_2$ may be controlled by adding/removing one or more materials including a hydrogen donor molecule. For instance, the hydrogen donor material may include, but is not limited to, $H_2$, $H_2O$ and any other hydrogen donor solvents known in the art, such as, (tetraline, tetrahydrofluoranthene (4HFL), dihydroanthacene (2HAn)).

In one embodiment, the separator unit 119 includes one or more physical flow separators. For example, the one or more physical flow separators may include one or more filters configured to separate one or more reaction products (e.g., char) from the supercritical fluid. By way of another example, the one or more physical flow separators may include a density-based separation, whereby one or more reaction products are separated from the supercritical fluid according to density.

In another embodiment, the one or more reaction products generated by the thermochemical reaction chamber 104 may include, but is not limited to, char, bio-oil, volatile gases and the like. In another embodiment, one or more of the reaction products from the thermochemical reaction chamber 104 are soluble in the supercritical fluid (e.g., supercritical CO2).

In another embodiment, the system 100 includes an electrical generation system 114. In one embodiment, the electrical generation system 114 is placed in fluidic communication with the thermochemical reaction chamber 104. In another embodiment, the electrical generation system 114 is configured to receive the supercritical fluid from the thermochemical reaction chamber 114 and generate electricity with the heated supercritical fluid following conversion of the feedstock 105 to one or more reaction products. It is noted herein that the supercritical fluid (e.g., supercritical $CO_2$) leaving the thermochemical reaction chamber 104 will have a temperature at or near the reaction temperature (e.g., pyrolysis reaction temperature) and, therefore, may contain sensible heat. In one embodiment, the supercritical fluid, upon exiting the thermochemical reaction chamber 104, may heat an additional working fluid via one or more heat exchangers (not shown in FIGS. 1A-1E). The heated additional working fluid may then drive a portion of the electrical generation system 114, such as a rotor of a turbine, in order to produce electricity.

In another embodiment, the supercritical fluid, upon exiting the thermochemical reaction chamber 104, may directly drive a portion of the electrical generation system 114. For example, the supercritical fluid, upon exiting the thermochemical reaction chamber 104, may directly drive a turbine (or other machinery for the production of work) to generate electricity. In another embodiment, one or more separation units 119, as described previously herein, may separate one or more reaction products from the super critical fluid exiting the chemical reaction chamber 104 prior to entry into the rotating machinery of the electrical generation system 114.

In another embodiment, electricity produced by the electrical generation system 114 is utilized to augment one or more sub-systems of system 100. In one embodiment, the electrical generation system 114 is electrically coupled to a portion of the system 100 and configured to augment the 100 with at least a portion of the generated electricity. For example, the electrical generation system 114 may be electrically coupled to a component of the thermochemical conversion system 102 and configured to augment the thermochemical conversion system 102 with at least a portion of the generated electricity. For instance, electricity form the electrical generation system 114 may be used to power one or more material transfer systems (e.g., feedstock supply system) of the thermochemical conversion system 102. In another instance, electricity form the electrical generation system 114 may be used to power one or more processing systems of the thermochemical conversion system 102. In another instance, electricity form the electrical generation system 114 may be used to power one or more heating systems (e.g., heating element of pre-heater) used to heat material utilized or processed by the thermochemical conversion system 102. By way of another example, the electrical generation system 114 may be electrically coupled to a component of the thermal energy transfer system 106 and configured to augment the thermal energy transfer system 106 with at least a portion of the generated electricity. For instance, electricity form the electrical generation system 114 may be used to power one or more pumps of the thermal energy transfer system 106.

In another embodiment, electricity produced by the electrical generation system 114 is transferred to an external power consuming system. In one embodiment, the electrical generation system 114 is electrically coupled to a portion of a consumer electrical grid and configured to supply electrical power to the electrical grid.

In another embodiment, electricity produced by the electrical generation system 114 is transferred to one or more operation systems of the one or more heat sources 108. In the case where the one or more heat sources 108 is a nuclear reactor, the electrical generation system 114 may be coupled to one or more operation systems of the nuclear reactor and configured to supply electrical power to the one or more operation systems (e.g., control system, safety system, coolant system (e.g., pump(s) of coolant system), security system and the like) of the nuclear reactor.

In another embodiment, the system 100 includes a hydrogen generation system (not shown). In one embodiment, the hydrogen generation system is electrically coupled to an electrical output of the electrical generation system 114 (or any other electrical generation system of system 100). For example, electricity produced by the electrical generation system 114 is transferred to the hydrogen generation system and configured to generate hydrogen. In another embodiment, the hydrogen generated via the electricity from the electrical generation system 114 may then be stored and utilized for hydrotreating and/or hydrocracking within system 100 (or other associated systems).

In another embodiment, the system 100 includes a quench system 120. In one embodiment, the quenching system 120 is placed in fluidic communication with the chemical reaction chamber 102, as shown in FIGS. 1A-1E. In this regard, the quench system 120 may receive reaction products from the thermochemical reaction chamber 104. In turn, heat may be extracted from the hot thermochemical reaction chamber 104 via a heat recovery and/or heat rejection system 126. The extraction of heat from the one or more reaction products may be cooled to a selected level. It is noted herein that this quenching process may take place quickly or may take place over several seconds. In one embodiment, the quenching system 120 may cool the reaction products from a reaction temperature (e.g., temperature of approximately 350-600° for pyrolysis reactions) to a temperature suitable for maintaining bio-oil (e.g., temperature between approximately 40° and 45° C.). In another embodiment, the quench system 120 may cool one or more reaction products from a reaction temperature to a temperature suitable for hydrotreating (e.g., temperature between approximately 200° and 400° C.) and hydrocracking (e.g., temperature between approximately 400° and 450° C.).

In another embodiment, the system 100 includes a heat recovery system 126. In the case of recovery, the system 126 may recover heat from the quench system (or any other appropriate sub-system of system 100) via a heat transfer loop acting to thermally couple the quench system 120 and the heat recovery system 126. In one embodiment, the recovered heat may serve as a recuperator or regenerator. In one embodiment, energy may be recovered after the turbine electrical generation system 114. In another embodiment, energy may be recovered following the thermochemical process carried out by chamber 104. In another embodiment, the recovered energy may be used to pre-heat feedstock material prior to thermochemical processing. In another embodiment, the recovered energy may be used to produce ancillary power (e.g., mechanical power or electrical power) to one or more sub-systems of the system 100.

In another embodiment, the system 100 may be coupled to a heat rejection system. In one embodiment, the heat rejection system (not shown) rejects nuclear generated heat to ambient conditions. In this manner multiple heat rejection systems or heat utilizing systems can be coupled. It is noted herein that this coupling may be desirable in the event the one or more heat sources 108 (e.g., nuclear reactor) provides more thermal energy than can be utilized by the thermochemical conversion system 102. In another embodiment, the heat rejection couple may be utilized to smooth thermal variations on the heat source 108 side (e.g., nuclear reactor side) of the overall thermal system. In another embodiment, in the case of a nuclear reactor based heat source, the heat rejection coupling may be used to guarantee a thermal path for the removal of a portion of nuclear generated heat to ambient conditions. This portion of nuclear generated heat may be proportional or equal to the amount of reactor decay heat the nuclear system is capable of producing, either immediately after shutdown, or within a desired time after shutdown In another embodiment, the system 100 includes a thermochemical treatment system 122. In one embodiment, the thermochemical treatment system 122 may carry out a treatment process on one or more reaction products. In another embodiment, the thermochemical treatment system 122 thermochemically treat the one or more reaction products following a quenching process. In one embodiment, the thermochemical treatment system 122 may carry out a hydrotreatment or hydrocracking process on the one or more reaction products. In another embodiment, the thermal energy from the one or more heat sources 108 may drive the hydrotreating and/or hydrocracking carried out by treatment system 122. In another embodiment, the hydrogen generated by system 100 during the thermochemical reaction process and subsequent processing may be utilized to hydrotreat or hydrocrack the one or more reaction products.

In another embodiment, the system 100 includes one or more storage systems 124 for storing one or more reaction products or one or more treated reaction products.

Figure 1D:
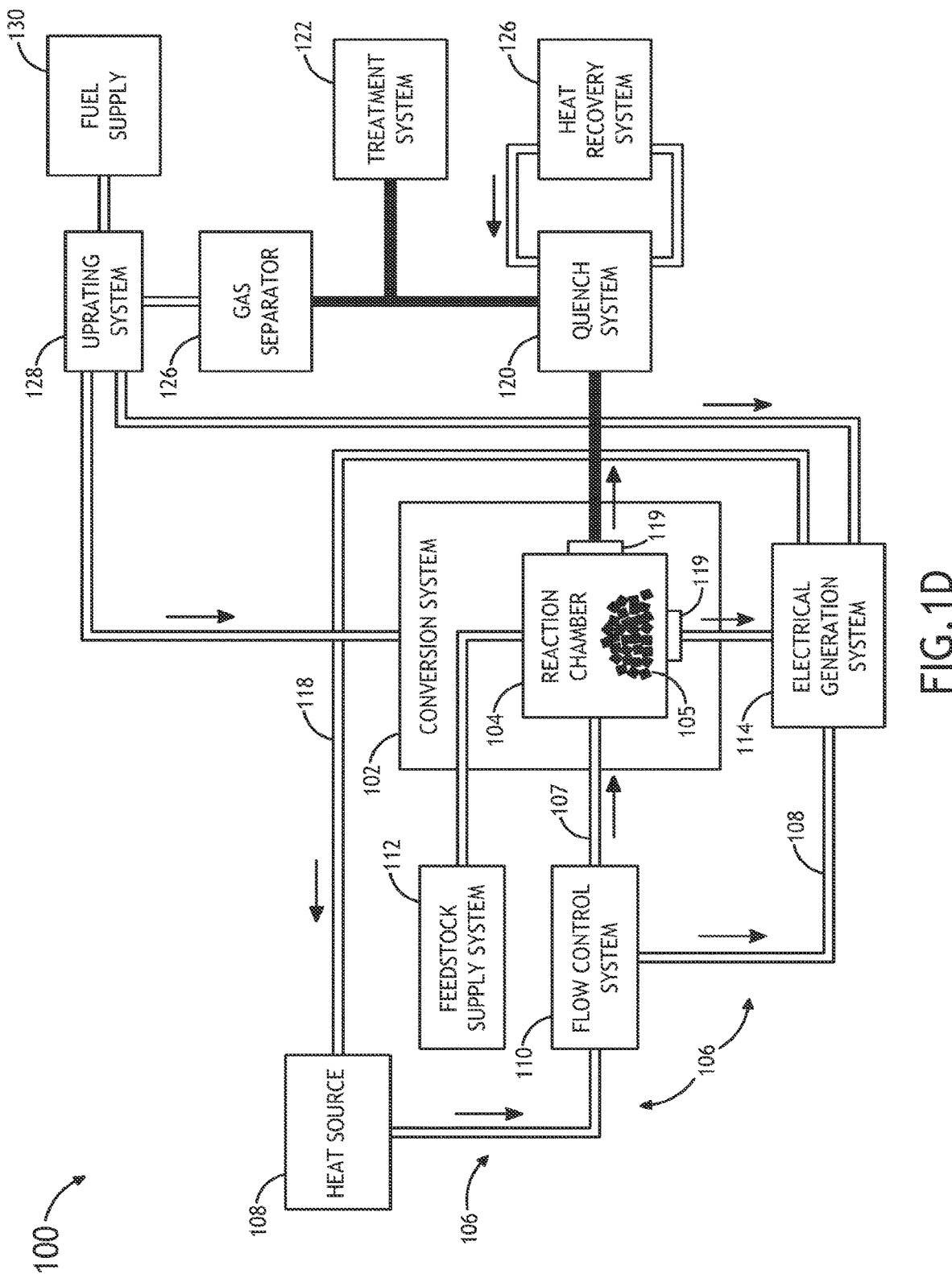
FIG. 1D is a block diagram view of a system for performing thermochemical conversion of a carbonaceous feedstock to a reaction product, in accordance with an illustrative embodiment.

FIG. 1D illustrates a volatile gas separator 126 of system 100, in accordance with one embodiment of system 100. In one embodiment, the volatile gas separator 126 may receive a volume of reaction products from the reaction chamber 104 or the quench system 120. In another embodiment, the volatile gas separator 126 may separate one or more volatile gases from the remainder of the one or more reaction products. For example, the volatile gas separator 126 may separate volatile gases such as, but not limited to, $CH_4$, $C_2H_4$, $C_2H_6$, $CO$, $CO_2$, $H_2$, $H_2O$ from the solid or liquid reaction products. It is noted herein that the volatile gas separator 126 may include any volatile gas separation device or process known in the art. It is further recognized that these gases may be cooled, cleaned, collected and stored for future utilization. Volatile gases may be produced in order to provide a hydrogen source for any one of the various thermochemical steps described in the present disclosure (e.g., hydrotreating and/or hydrocracking).

In another embodiment, the system 100 includes an uprating system 128 for uprating the volatile gas from the gas separator 126 and/or producing $H_2$. In one embodiment, the uprating system 128 is coupled to external fuel supply 130. In this regard, the external fuel supply 130 may supplement the volatile gas with external fuel to generate uprated synthesis gas (i.e., syngas) and/or $H_2$. For example, the external fuel supply 130 may supply a hydrocarbon (e.g., methane, natural gas and the like), water, steam, heat and/or electricity to the volatile gas to generate synthesis gas and/or $H_2$.

In another embodiment, the uprated volatile gases may be transferred to one or more portions of the system 100 in order to enhance one or more processes within the system 100. For example, the uprated volatile gases may transferred to one or more portions of the thermochemical conversion system 102 (e.g., thermochemical reaction chamber 104) in order to volatize one or more compounds or hydrogenate one or more compounds produced from one or more thermochemical reactions (e.g., thermochemical reactions taking place during liquefaction, extraction, pyrolysis and the like). By way of another example, the uprated volatile gases may be combined with oxygen and/or air and provided to an electrical generation system (e.g., system 114, system 132 and the like) and combusted to add heat to a selected fluid stream prior to expansion in the electrical generation system (e.g., turbine of electrical generation system 114).

Figure 1E:
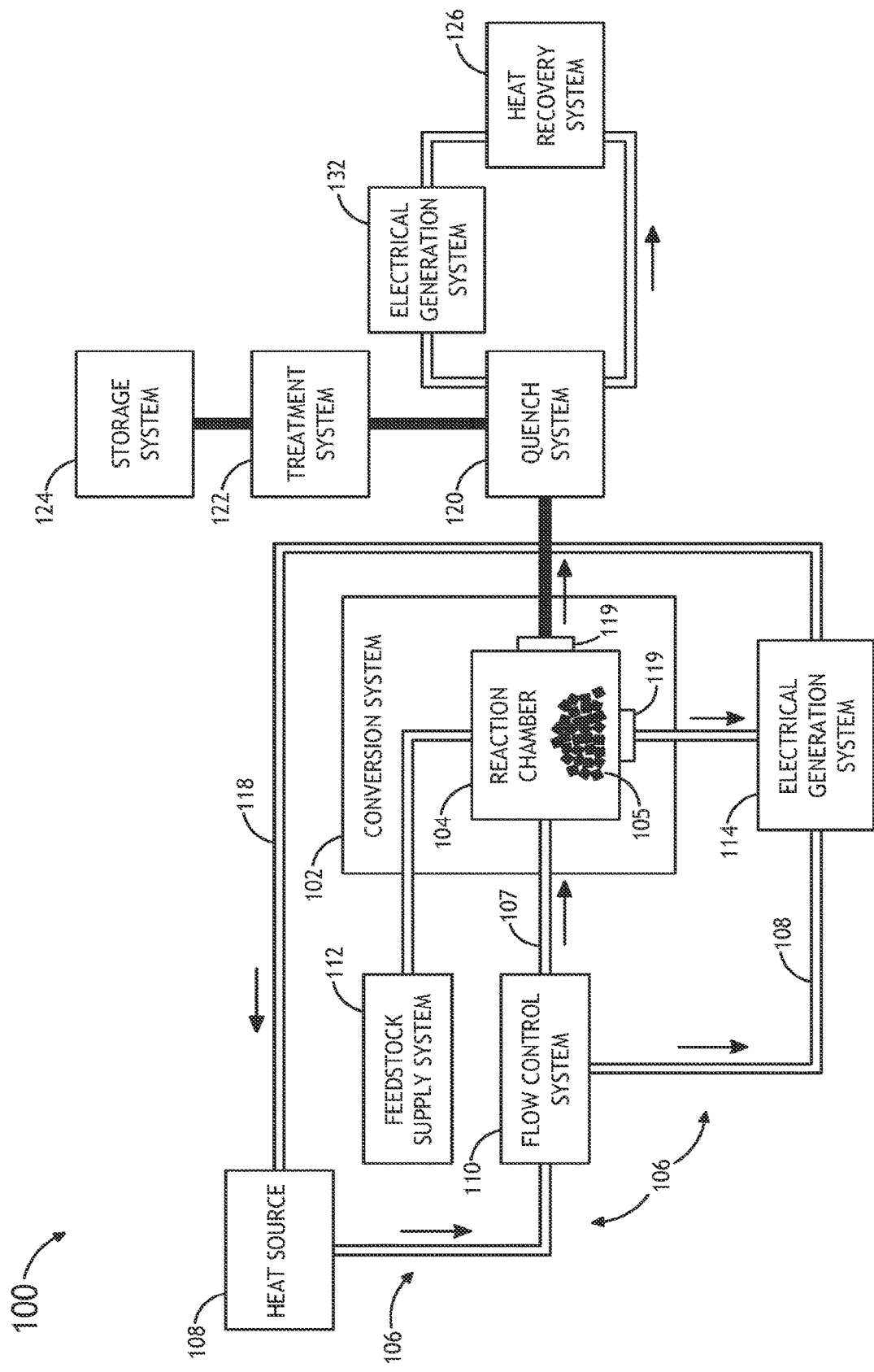
FIG. 1E is a block diagram view of a system for performing thermochemical conversion of a carbonaceous feedstock to a reaction product, in accordance with an illustrative embodiment.

In another embodiment, as shown in FIG. 1E, the system 100 may include an additional electrical generation system 132. In one embodiment, the additional electrical generation system 132 may be couple to any portion of the thermochemical conversion system 102 where sensible heat may be obtained. For example, as shown in FIG. 1E, the electrical generation system 132 may be coupled to the heat transfer loop between the quench system 120 and heat recovery system 126.

Following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Figure 2:
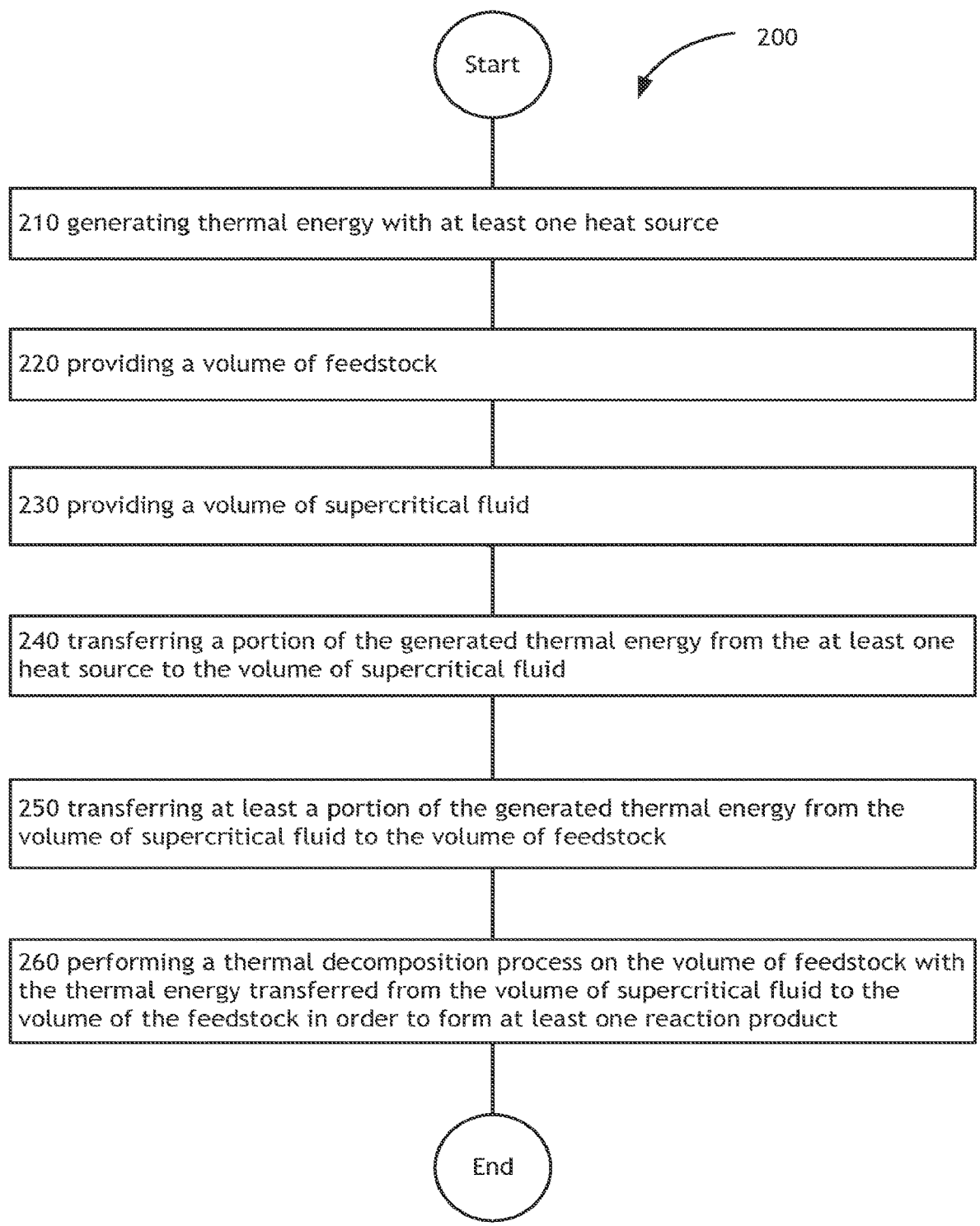
FIG. 2 is a high-level flowchart of a method for performing thermochemical conversion of a carbonaceous feedstock to a reaction product.

FIG. 2 illustrates an operational flow 200 representing example operations related to performing thermochemical conversion of a feedstock to a reaction product. In FIG. 2 and in following figures that include various examples of operational flows, discussion and explanation may be provided with respect to the above-described examples of FIGS. 1A through 1E, and/or with respect to other examples and contexts. However, it should be understood that the operational flows may be executed in a number of other environments and contexts, and/or in modified versions of FIGS. 1A through 1E. Also, although the various operational flows are presented in the sequence(s) illustrated, it should be understood that the various operations may be performed in other orders than those which are illustrated, or may be performed concurrently.

After a start operation, the operational flow 200 moves to an energy generating operation 210. The energy generating operation 210 depicts generating thermal energy with at least one heat source 108. For example, as shown in FIGS. 1A through 1E, one or more heat sources 108 may generate thermal energy. For instance, the one or more heat sources 108 may include, but are not limited to, one or more nuclear reactors, such as, but not limited to, a molten salt cooled nuclear reactor, a liquid metal cooled reactor, a gas cooled reactor or a supercritical fluid cooled reactor.

Then, feedstock providing operation 220 depicts providing a volume of feedstock. For example, as shown in FIGS. 1A through 1E, a feed stock supply system 112 may provide a volume of feedstock 105 to one or more thermochemical reaction chambers 104. For instance, the feed stock supply system 112 may include a solid or liquid transfer system for transferring a supply of feedstock to the one or more thermochemical reaction chamber 104.

Then, supercritical fluid providing operation 230 depicts providing a volume of supercritical fluid. For example, as shown in FIGS. 1A through 1E, a volume of supercritical fluid may be provided and stored within a heat transfer element 107 of the thermal energy transfer system 106. For instance, the supercritical fluid may include, but is not limited to, supercritical carbon dioxide and supercritical water.

Then, energy transfer operation 240 depicts transferring a portion of the generated thermal energy to the volume of supercritical fluid. For example, as shown in FIGS. 1A through 1E, thermal energy generated by one or more heat sources 108 may be transferred to a supercritical fluid contained within a heat transfer element 107 of a thermal energy transfer system 106.

Then, energy transfer operation 250 depicts transferring at least a portion of the generated thermal energy from the volume of supercritical fluid to the volume of feedstock. For example, as shown in FIGS. 1A through 1E, thermal energy stored within the supercritical fluid contained within the heat transfer element 107 of a thermal energy transfer system 106 may be transferred to the feedstock material 105 contained within the thermochemical reaction chamber 104.

Then, the thermal decomposition operation 260 depicts performing a thermal decomposition process on the volume of feedstock with the thermal energy transferred from the volume of supercritical fluid to the volume of the feedstock in order to form at least one reaction product. For example, as shown in FIGS. 1A through 1E, the heat transfer element 107 may supply the supercritical fluid to the feedstock material contained within the thermochemical reaction chamber 104. The thermal energy stored in the supercritical fluid along with the penetration and expansion characteristics of the supercritical fluid may thermally decompose a portion of the feedstock 105 to form one or more reaction products (e.g., bio-oil).

Figure 3:
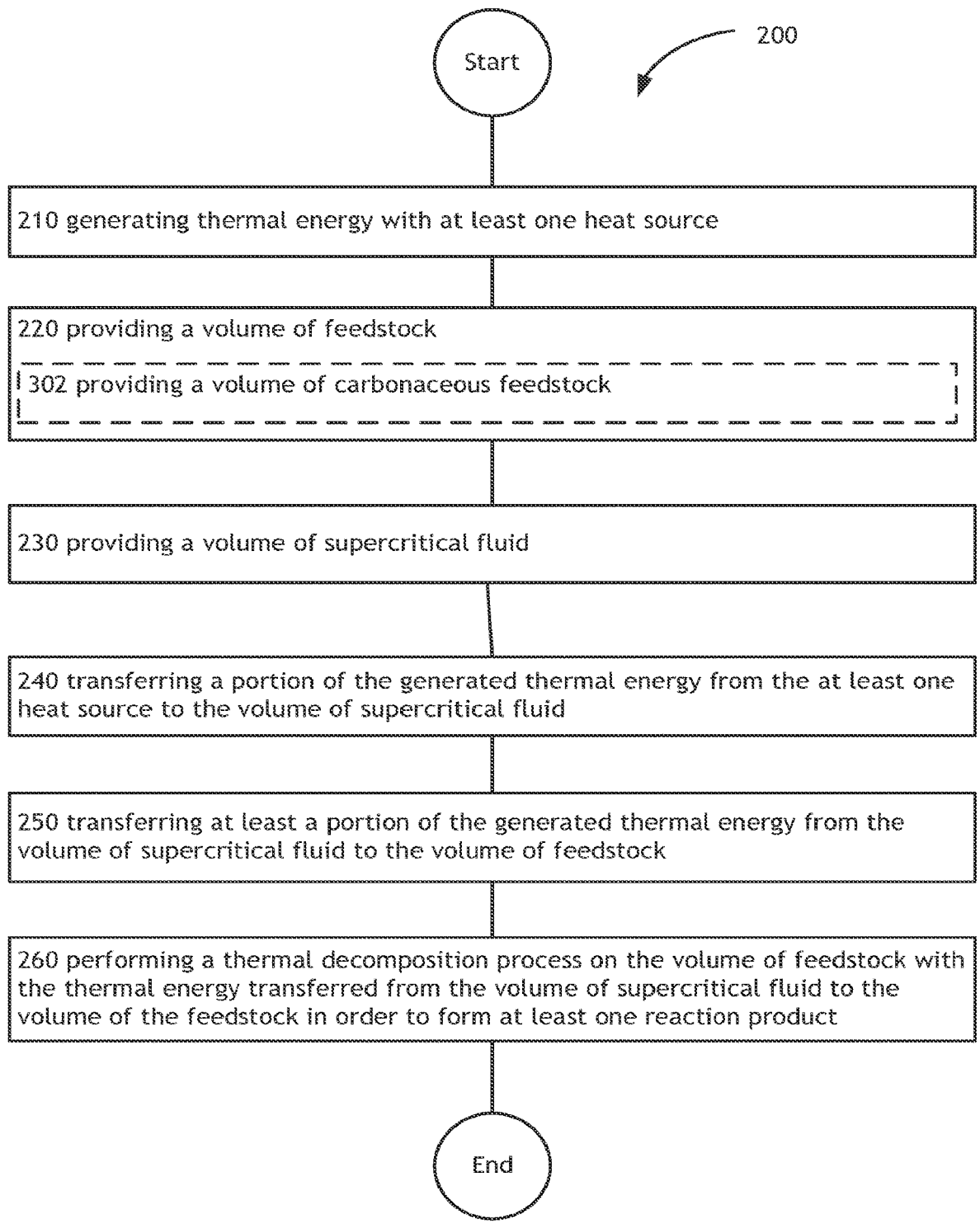
FIGS. 3 through 15E are high-level flowcharts depicting alternate implementations of FIG. 2.

FIG. 3 illustrates alternative embodiments of the example operational flow 200 of FIG. 2. FIG. 3 illustrates example embodiments where the providing operation 220 may include at least one additional operation. An Additional operation may include operation 302.

The operation 302 illustrates providing a volume of carbonaceous feedstock. For example, as shown in FIGS. 1A through 1E, a feed stock supply system 112 may provide a volume of carbonaceous feedstock 105 to one or more thermochemical reaction chambers 104. For instance, the feed stock supply system 112 may include a solid or liquid transfer system for transferring a supply of carbonaceous feedstock to the one or more thermochemical reaction chambers 104. The carbonaceous feedstock may include, but is not limited to, coal, a biomass material, mixed-source biomaterial, plastic, refuse and landfill waste.

Figure 4:
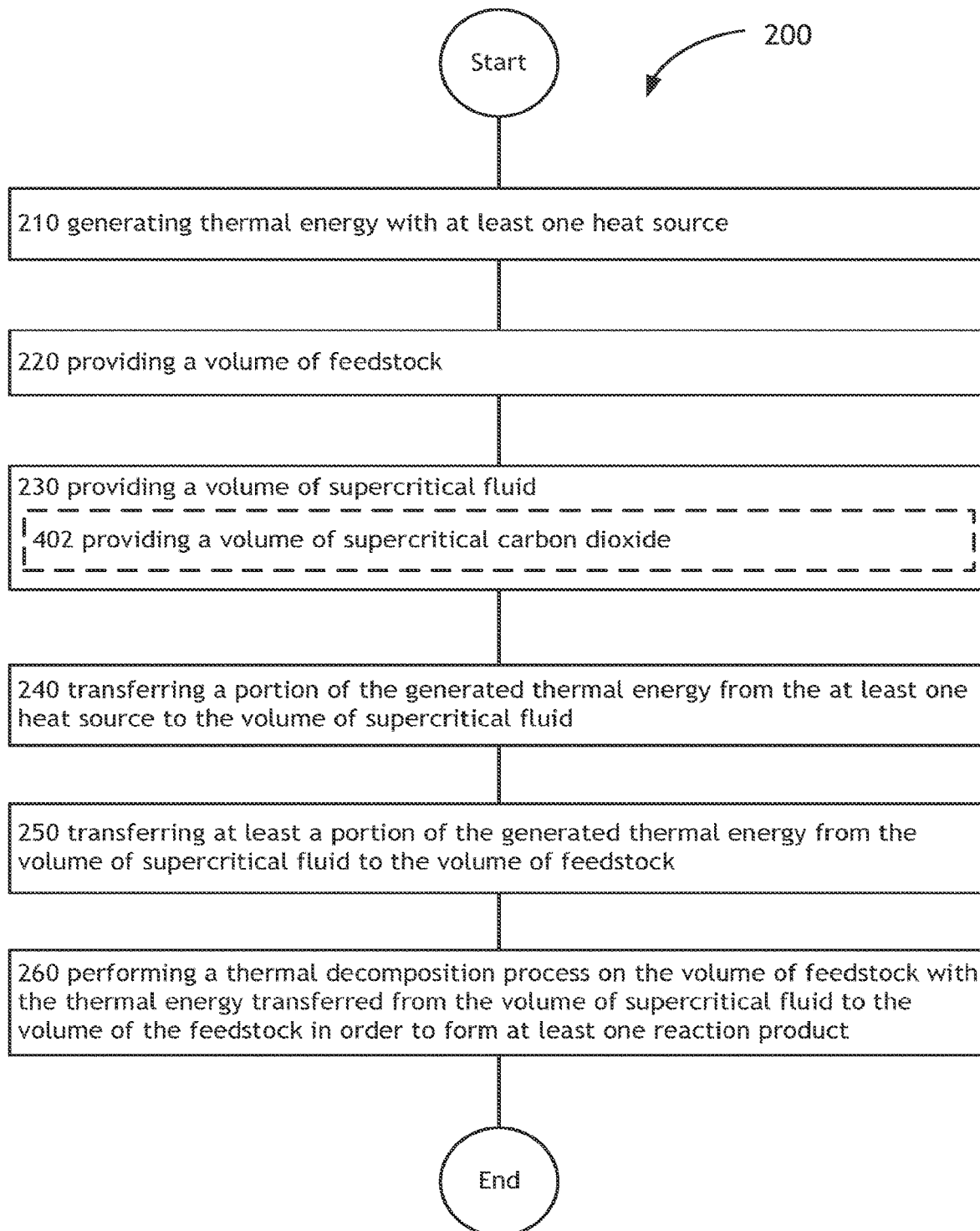

FIG. 4 illustrates alternative embodiments of the example operational flow 200 of FIG. 2. FIG. 4 illustrates example embodiments where the providing operation 230 may include at least one additional operation. An Additional operation may include operation 402.

The operation 402 illustrates providing a volume of carbonaceous feedstock. For example, as shown in FIGS. 1A through 1E, thermal energy generated by one or more heat sources 108 may be transferred to a volume of supercritical carbon dioxide contained within a heat transfer element 107 of a thermal energy transfer system 106.

Figure 5:
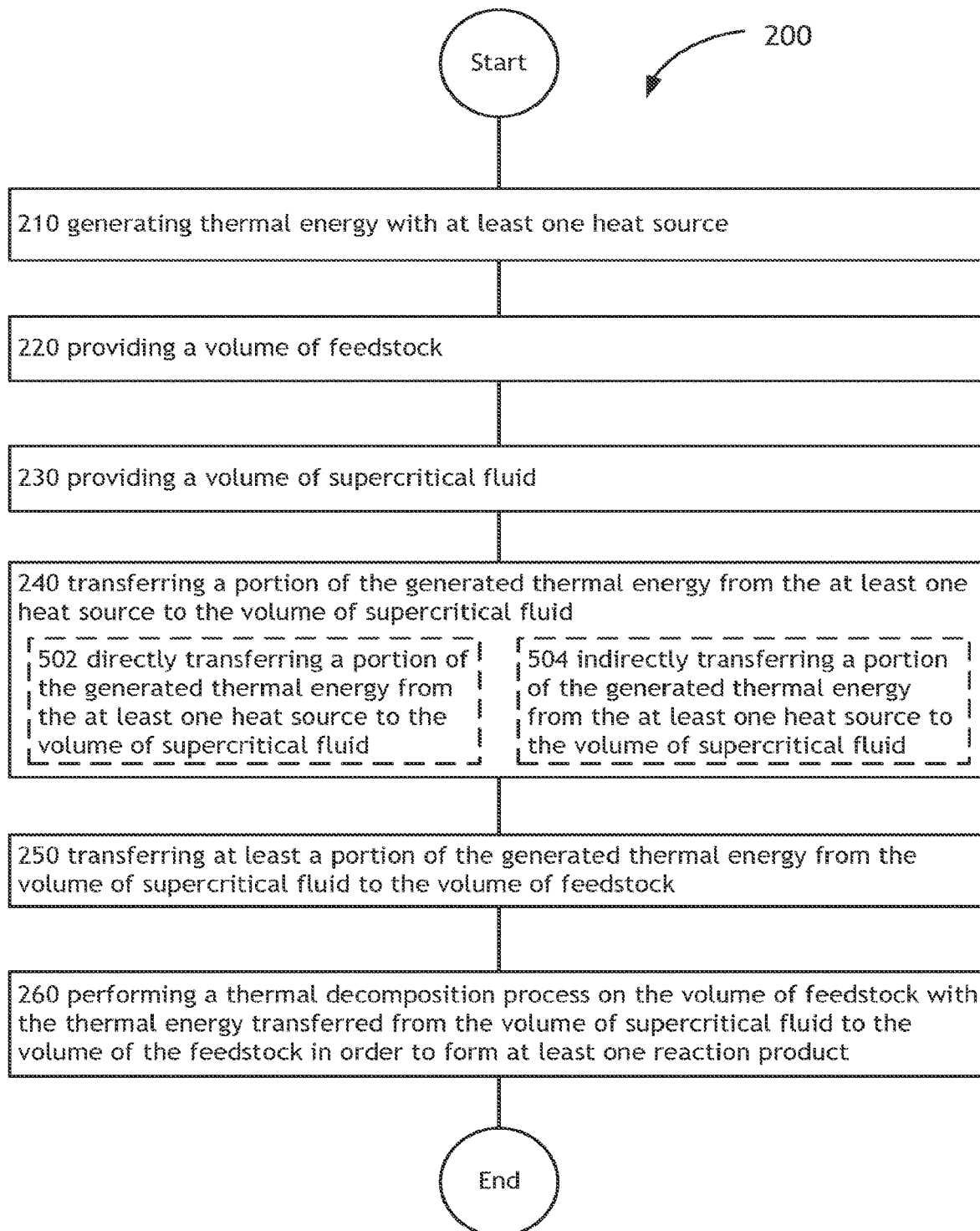

FIG. 5 illustrates alternative embodiments of the example operational flow 200 of FIG. 2. FIG. 5 illustrates example embodiments where the transferring operation 240 may include at least one additional operation. Additional operations may include operations 502 and/or 504.

The operation 502 illustrates directly transferring a portion of the generated thermal energy from the at least one heat source to the volume of supercritical fluid. For example, as shown in FIGS. 1A through 1E, the heat transfer element 107 of the thermal energy transfer system 106 may couple the working fluid of the one or more heat sources 108 (e.g., supercritical fluid serving as coolant for nuclear reactor) directly the thermochemical reaction chamber 104.

In another embodiment, operation 504 illustrates indirectly transferring a portion of the generated thermal energy from the at least one heat source to the volume of supercritical fluid. For example, as shown in FIGS. 1A through 1E, the system 100 may include an intermediate heat transfer system 111 configured to transfer thermal energy from the working fluid of the one or more heat sources 108 to the heat transfer fluid of the heat intermediate heat transfer element 113 (e.g., heat transfer loop) via heat exchanger 115. In turn, the intermediate thermal energy transfer system 113 is arranged to transfer thermal energy from the intermediate heat transfer element 113 to the supercritical working fluid of the thermochemical conversion system via heat exchanger 113.

Figure 6:
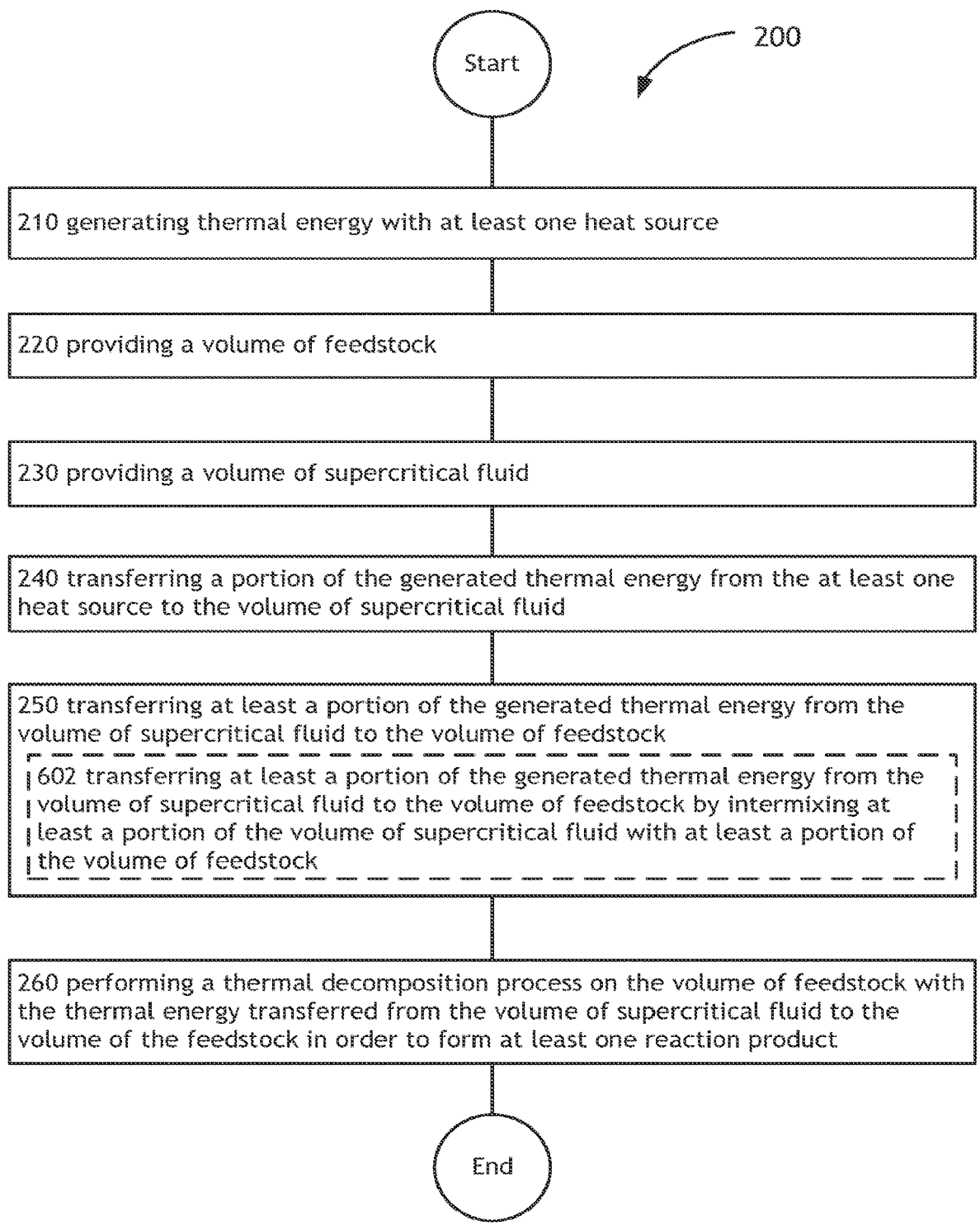

FIG. 6 illustrates alternative embodiments of the example operational flow 200 of FIG. 2. FIG. 6 illustrates example embodiments where the transferring operation 250 may include at least one additional operation. An Additional operation may include operation 602.

The operation 602 illustrates transferring at least a portion of the generated thermal energy from the volume of supercritical fluid to the volume of feedstock by intermixing at least a portion of the volume of supercritical fluid with at least a portion of the volume of feedstock. For example, as shown in FIGS. 1A through 1E, the heat transfer element 107 may flow the supercritical fluid directly into the interior of the thermochemical reaction chamber 104 in order to intermix the supercritical fluid with the feedstock material 105 disposed within the reaction chamber 105, thereby transferring a portion of the thermal energy stored within the supercritical fluid, such as supercritical carbon dioxide, to the volume of feedstock.

Figure 7:
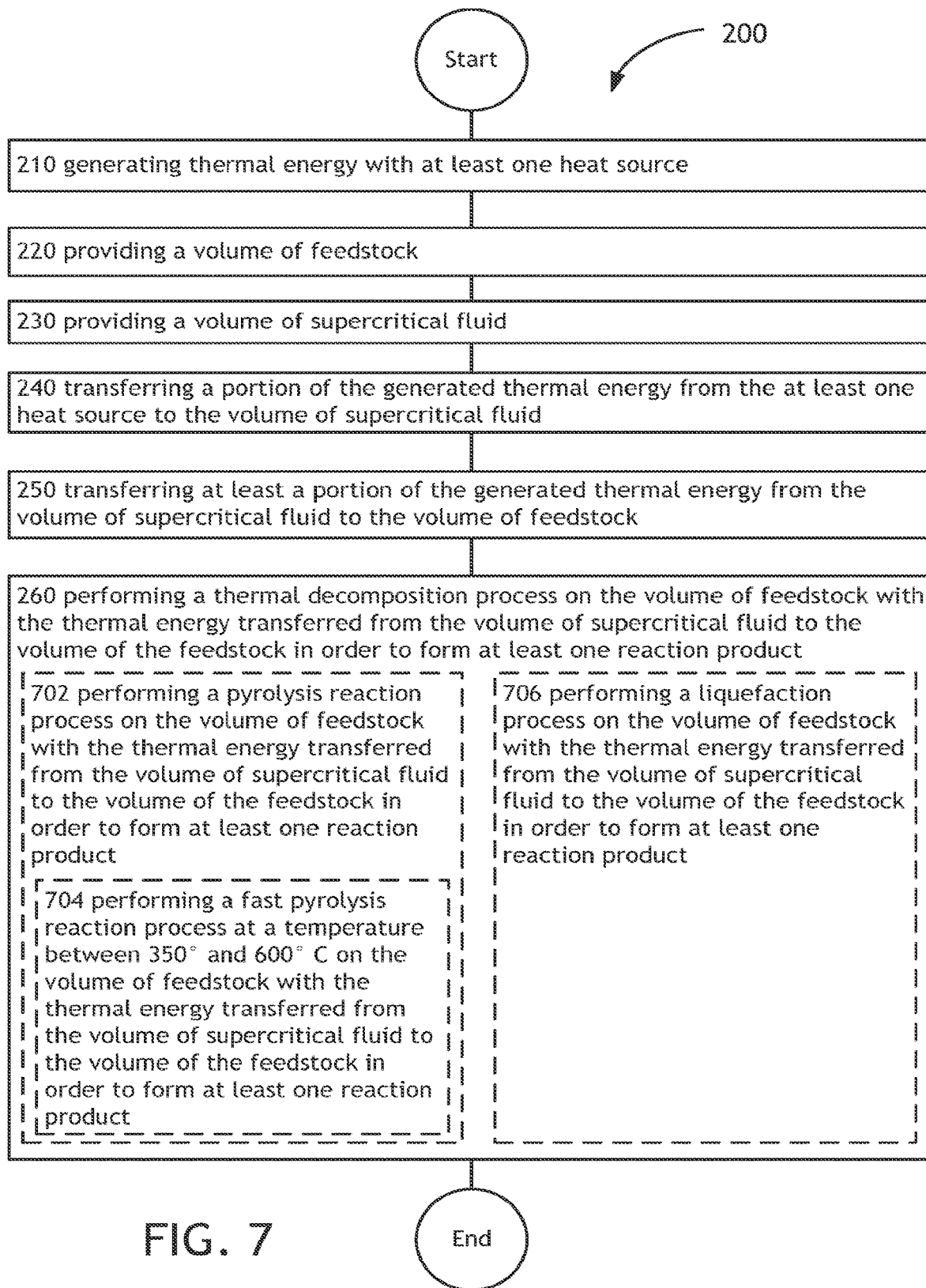

FIG. 7 illustrates alternative embodiments of the example operational flow 200 of FIG. 2. FIG. 7 illustrates example embodiments where the thermal decomposition operation 260 may include at least one additional operation. Additional operations may include operations 702, 704 and/or 706.

The operation 702 illustrates performing a pyrolysis reaction process on the volume of feedstock with the thermal energy transferred from the volume of supercritical fluid to the volume of the feedstock in order to form at least one reaction product. For example, as shown in FIGS. 1A through 1E, the thermochemical reaction chamber 104 may include a pyrolysis chamber in thermal communication with the supercritical fluid contained in the heat transfer element 107. Further, the pyrolysis chamber may carry out a pyrolysis process on the feedstock 105 utilizing the thermal energy supplied to the pyrolysis chamber with the supercritical fluid.

In another embodiment, operation 704 illustrates performing a fast pyrolysis reaction process at a temperature between 350° and 600° C. on the volume of feedstock with the thermal energy transferred from the volume of supercritical fluid to the volume of the feedstock in order to form at least one reaction product. For example, as shown in FIGS. 1A through 1E, the thermochemical reaction chamber 104 may include a fast pyrolysis chamber in thermal communication with the supercritical fluid having a temperature between 350° and 600° C. contained in the heat transfer element 107. Further, the pyrolysis chamber may carry out a fast pyrolysis process on the feedstock 105 utilizing the thermal energy supplied to the fast pyrolysis chamber with the supercritical fluid.

In another embodiment, the operation 706 illustrates performing a liquefaction process on the volume of feedstock with the thermal energy transferred from the volume of supercritical fluid to the volume of the feedstock in order to form at least one reaction product. For example, as shown in FIGS. 1A through 1E, the thermochemical reaction chamber 104 may include a liquefaction chamber in thermal communication with the supercritical fluid contained in the heat transfer element 107. Further, the liquefaction chamber may carry out a liquefaction process on the feedstock 105 utilizing the thermal energy supplied to the liquefaction chamber with the supercritical fluid.

Figure 8:
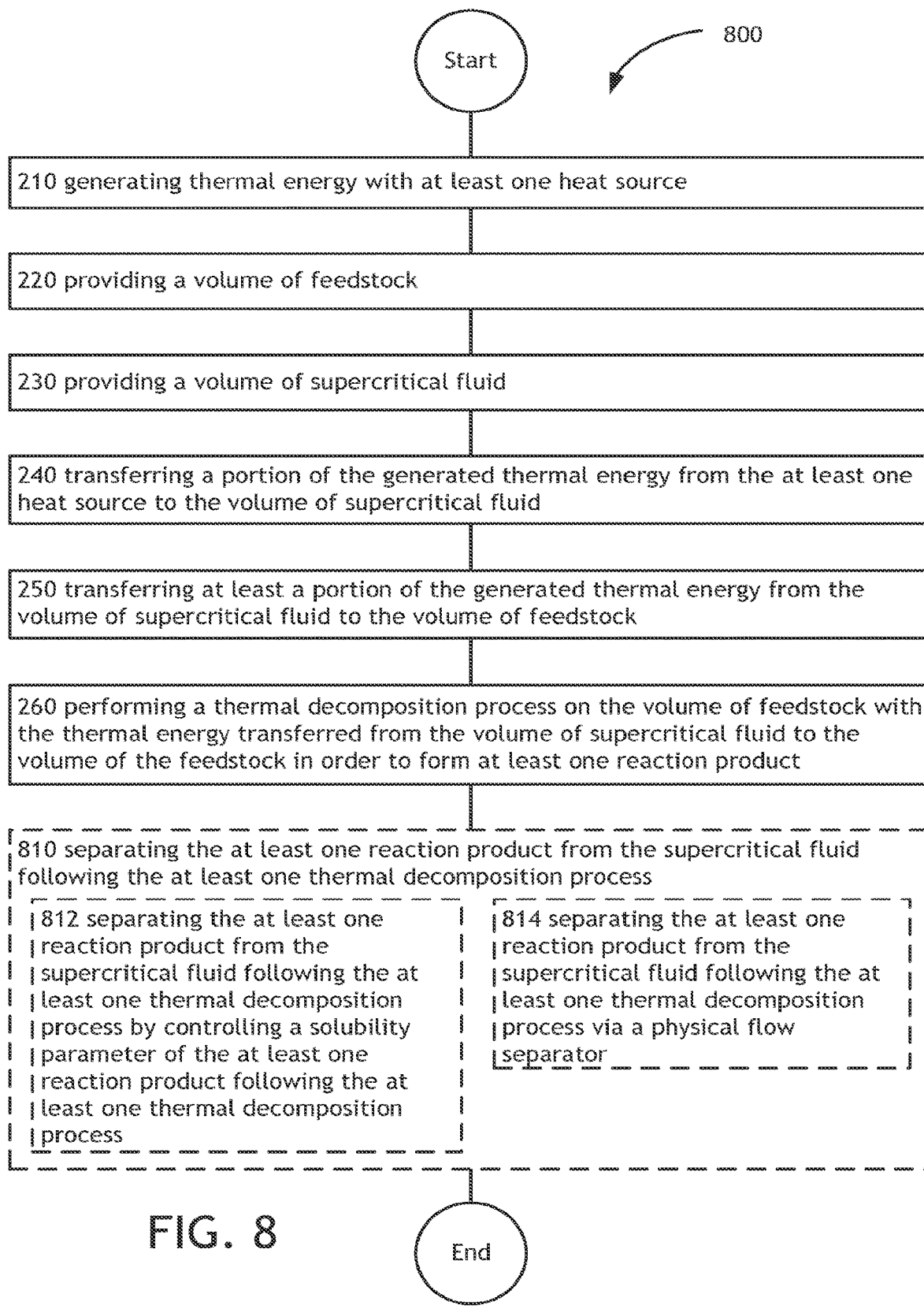

FIG. 8 illustrates an operational flow 800 representing example operations related to performing thermochemical conversion of a feedstock to a reaction product. FIG. 8 illustrates an example embodiment where the example operational flow 800 of FIG. 8 may include at least one additional operation. Additional operations may include separating operations 810, 812 and/or 814.

The operation 810 illustrates separating the at least one reaction product from the supercritical fluid following the at least one thermal decomposition process. For example, as shown in FIGS. 1A through 1E, the system 100 may include a separator unit 119 coupled to the thermochemical reaction chamber and configured to separate the one or more reaction products (e.g., bio-oil) from the supercritical fluid (e.g., supercritical carbon dioxide) following the thermal decomposition process.

In another embodiment, the operation 812 illustrates separating the at least one reaction product from the supercritical fluid following the at least one thermal decomposition process by controlling a solubility parameter of the at least one product following the at least one thermochemical decomposition process. For example, as shown in FIGS. 1A through 1E, the system 100 may include a separator unit 119 coupled to the thermochemical reaction chamber and configured to separate the one or more reaction products (e.g., bio-oil) from the supercritical fluid (e.g., supercritical carbon dioxide) following the thermal decomposition process by controlling a solubility parameter of one or more reaction products. For instance, the separator unit 119 may control a solubility parameter by controlling the pressure of the supercritical fluid.

In another embodiment, the operation 814 illustrates separating the at least one reaction product from the supercritical fluid following the at least one thermal decomposition process via a physical flow separator. For example, as shown in FIGS. 1A through 1E, the system 100 may include a separator unit 119 coupled to the thermochemical reaction chamber and configured to separate the one or more reaction products (e.g., bio-oil) from the supercritical fluid (e.g., supercritical carbon dioxide) following the thermal decomposition process via a physical flow separator. For instance, the physical flow separator may include a density-based separator unit.

Figure 9:
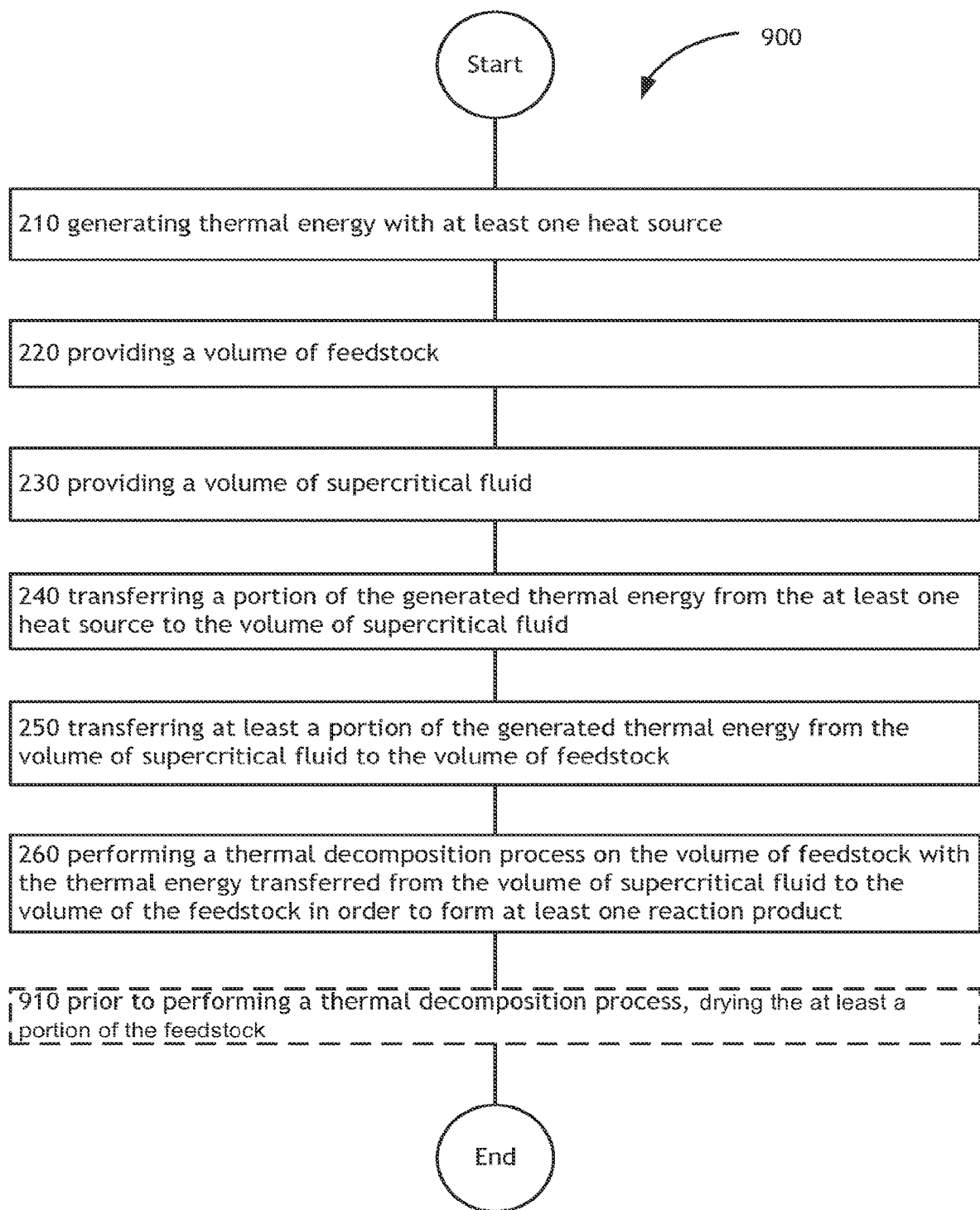

FIG. 9 illustrates an operational flow 900 representing example operations related to performing thermochemical conversion of a feedstock to a reaction product. FIG. 9 illustrates an example embodiment where the example operational flow 900 of FIG. 9 may include at least one additional operation. An additional operation may include drying operation 910.

The operation 910 illustrates prior to performing a thermal decomposition process drying the at least a portion of the feedstock. For example, as shown in FIGS. 1A through 1E, the system 100 may include a dryer 134 for drying (e.g., drying to a moisture level of 5-15%) the feedstock material 105 prior to the thermal decomposition process being carried out by the thermochemical reaction chamber 104.

Figure 10:
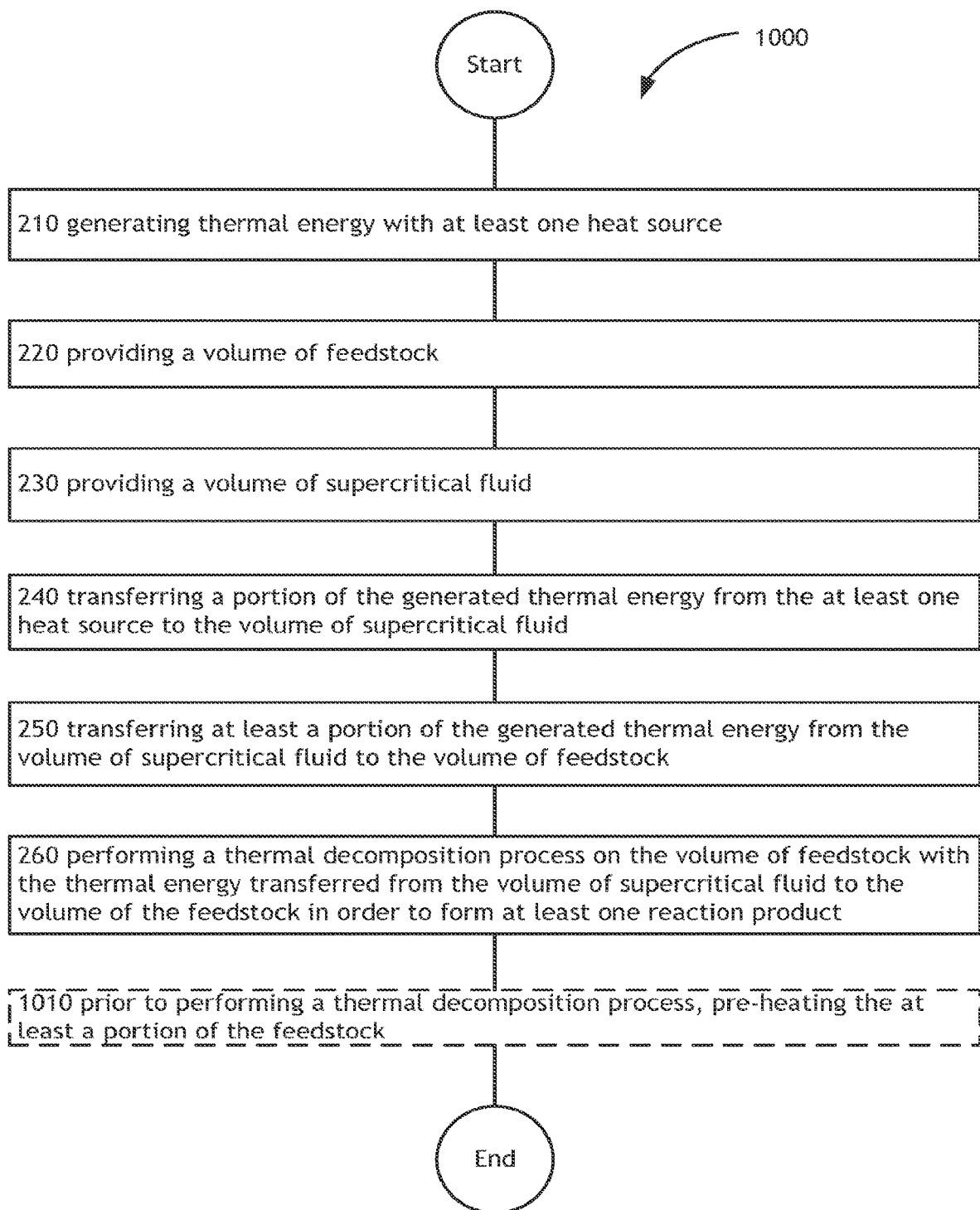

FIG. 10 illustrates an operational flow 1000 representing example operations related to performing thermochemical conversion of a feedstock to a reaction product. FIG. 10 illustrates an example embodiment where the example operational flow 1000 of FIG. 10 may include at least one additional operation. An additional operation may include pre-heating operation 1010.

The operation 1010 illustrates prior to performing a thermal decomposition process pre-heating the at least a portion of the feedstock. For example, as shown in FIGS. 1A through 1E, the system 100 may include a pre-heater for pre-heating the feedstock material 105 to a temperature at or near the reaction temperature required by the thermochemical reaction chamber 104 prior to the thermal decomposition process being carried out by the thermochemical reaction chamber 104.

Figure 11:
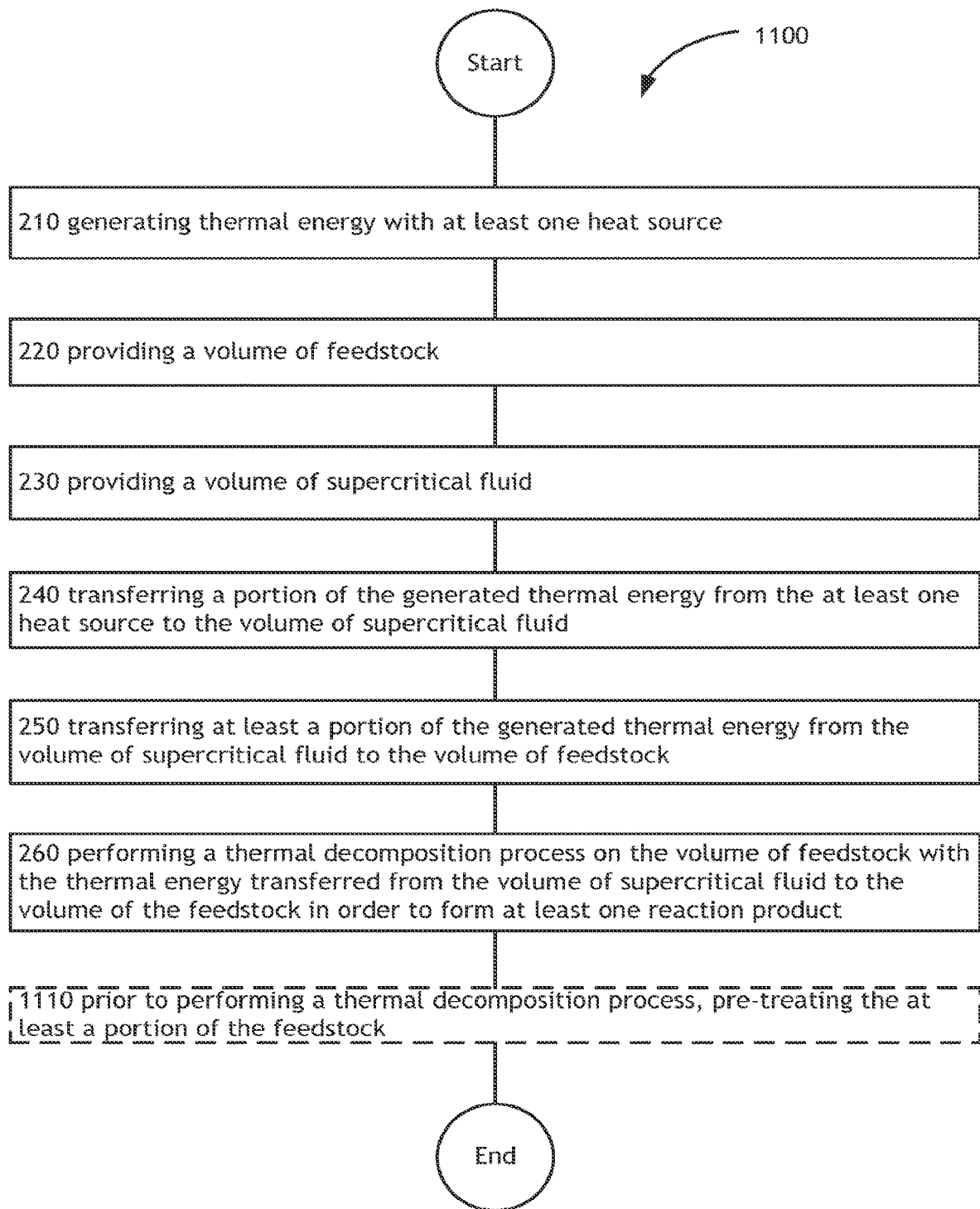

FIG. 11 illustrates an operational flow 1100 representing example operations related to performing thermochemical conversion of a feedstock to a reaction product. FIG. 11 illustrates an example embodiment where the example operational flow 1100 of FIG. 11 may include at least one additional operation. An additional operation may include pre-treating operation 1110.

The operation 1110 illustrates prior to performing a thermal decomposition process pre-treating the at least a portion of the feedstock. For example, as shown in FIGS. 1A through 1E, the system 100 may include a pre-treater for pre-treating the feedstock material 105 prior to the thermal decomposition process being carried out by the thermochemical reaction chamber 104. For instance, a pre-treater (or treatment system 122) may pre-hydrotreat the feedstock material prior to the thermal decomposition process being carried out by the thermochemical reaction chamber 104.

Figure 12:
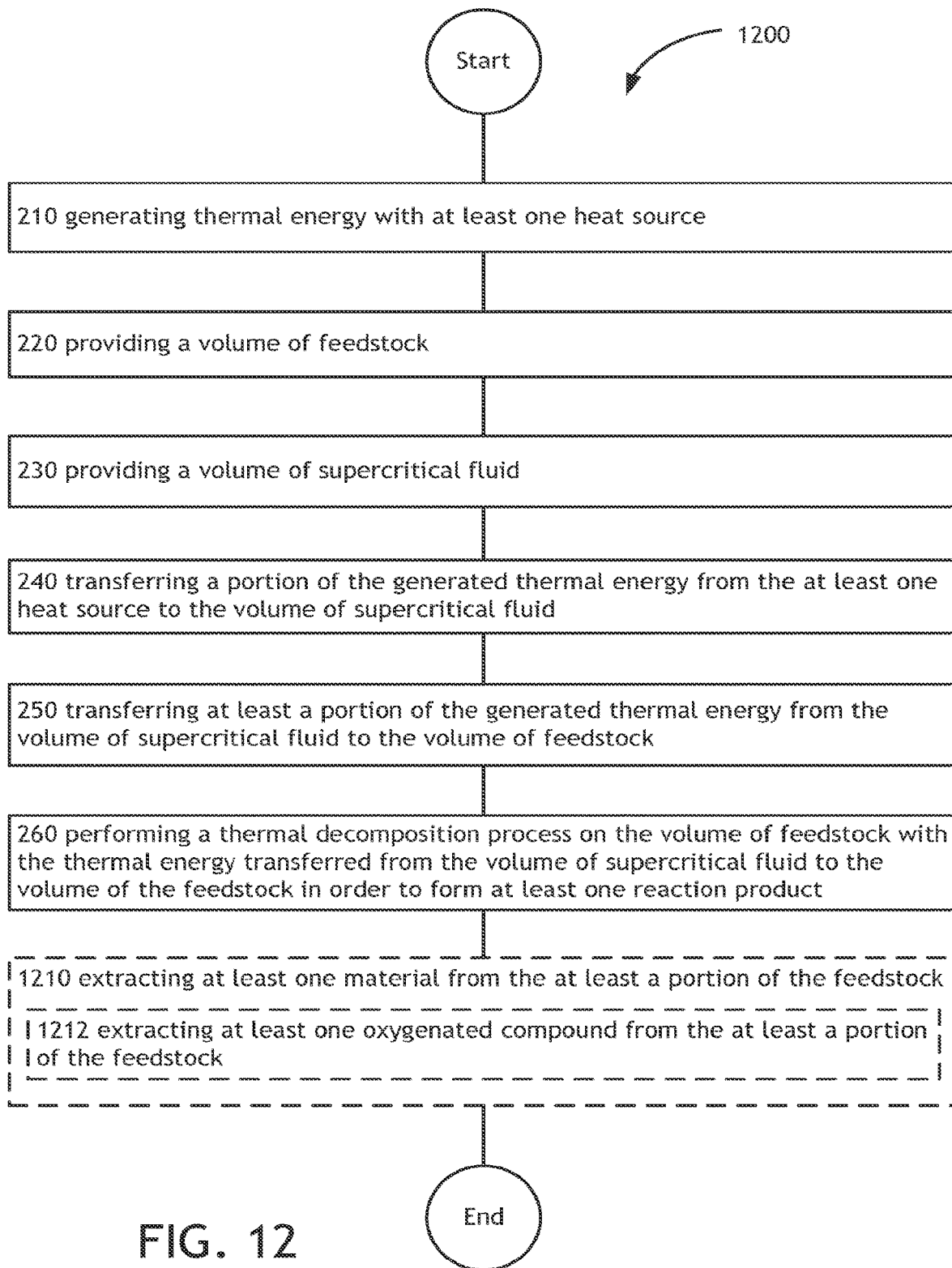

FIG. 12 illustrates an operational flow 1200 representing example operations related to performing thermochemical conversion of a feedstock to a reaction product. FIG. 12 illustrates an example embodiment where the example operational flow 1200 of FIG. 12 may include at least one additional operation. Additional operations may include extracting operations 1210 and/or 1211.

The operation 1210 illustrates extracting at least one material from the at least a portion of the feedstock. For example, as shown in FIGS. 1A through 1E, the thermochemical reaction chamber 104 is configured to remove additional compounds from the feedstock material prior to pyrolysis utilizing the supercritical fluid to carry away the materials.

The operation 1212 illustrates extracting at least one oxygenated compound from the at least a portion of the feedstock. For example, as shown in FIGS. 1A through 1E, the thermochemical reaction chamber 104 may be configured to remove at least one of oils and lipids, sugars, or other oxygenated compounds.

Figure 13A:
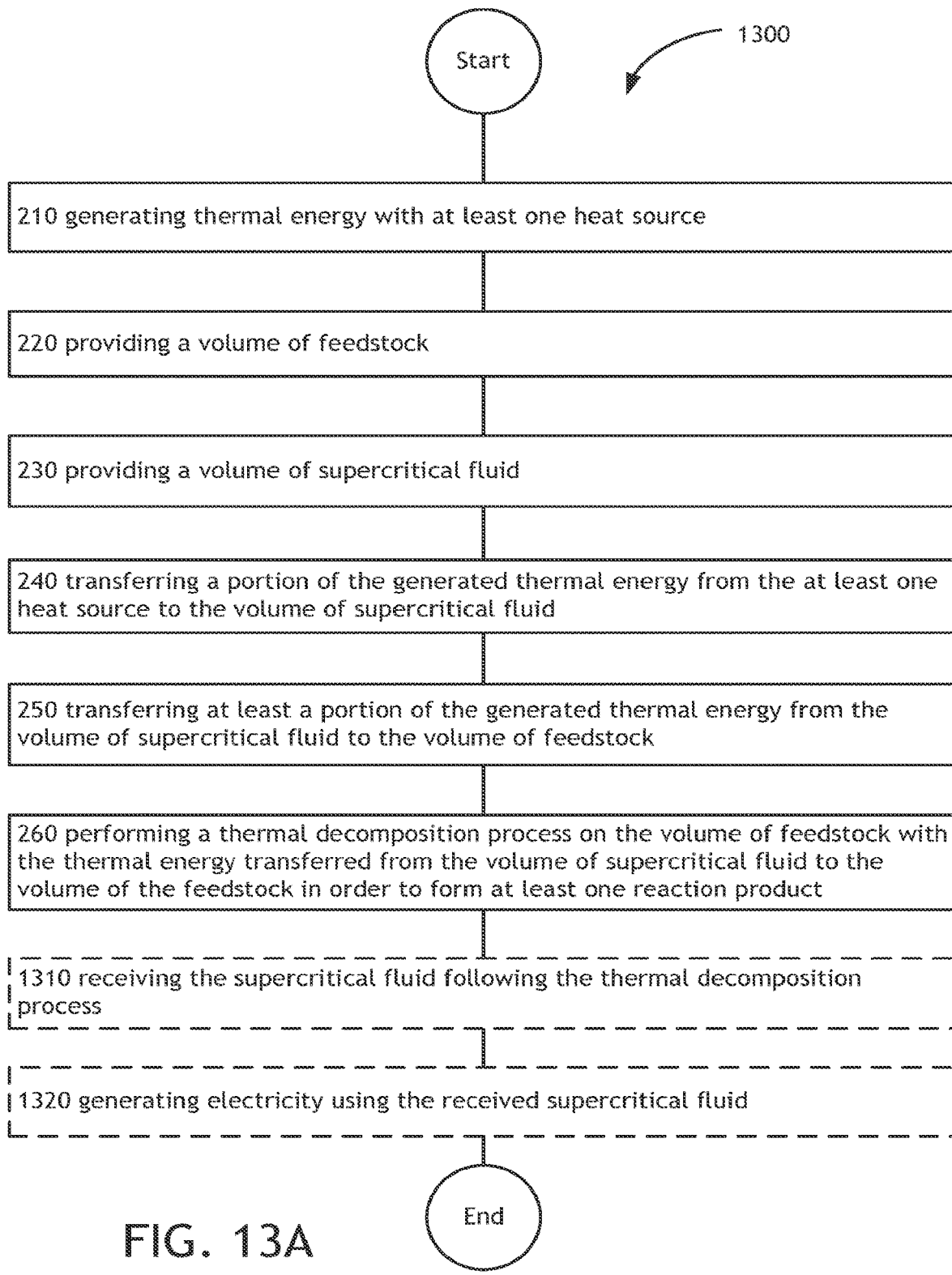

FIG. 13A illustrates an operational flow 1300 representing example operations related to performing thermochemical conversion of a feedstock to a reaction product. FIG. 13A illustrates an example embodiment where the example operational flow 1300 of FIG. 13A may include at least one additional operation. Additional operations may include operations 1310 and/or 1320.

The operation 1310 illustrates receiving the supercritical fluid following the thermochemical decomposition process. For example, as shown in FIGS. 1A through 1E, an electrical generation system 114 may receive the supercritical fluid from an outlet of the thermochemical reaction chamber 104 following the thermal decomposition process.

The operation 1312 illustrates generating electricity using the received supercritical fluid. For example, as shown in FIGS. 1A through 1E, the electrical generation system 114 may generate electricity utilizing the supercritical fluid. For instance, supercritical fluid may drive a turbine of the electrical generation system 114 in order to generate electricity.

Figure 13B:
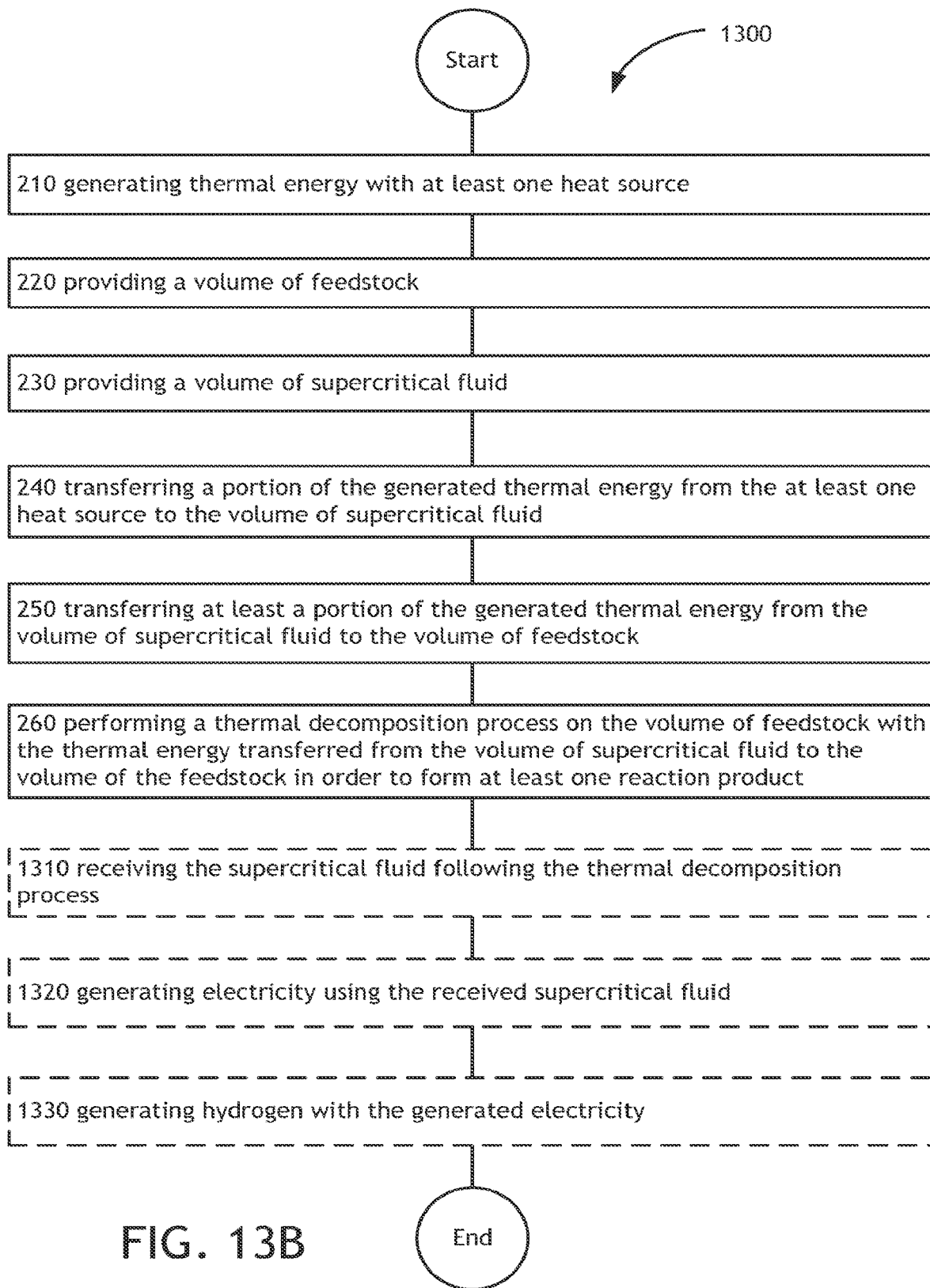

FIG. 13B illustrates additional embodiments of the example operational flow 1300 of FIG. 13A. FIG. 13B illustrates an example embodiment where the example operational flow 1300 of FIG. 13B may include at least one additional operation. An additional operation may include operations 1330.

The operation 1330 illustrates generating hydrogen with the generated electricity. For example, as shown in FIGS. 1A through 1E, a hydrogen generation unit may be coupled to the electrical output of the electrical generation system 114. In this regard, electricity from the electrical generation system 114 may drive the hydrogen generation unit in order to generate hydrogen.

Figure 14:
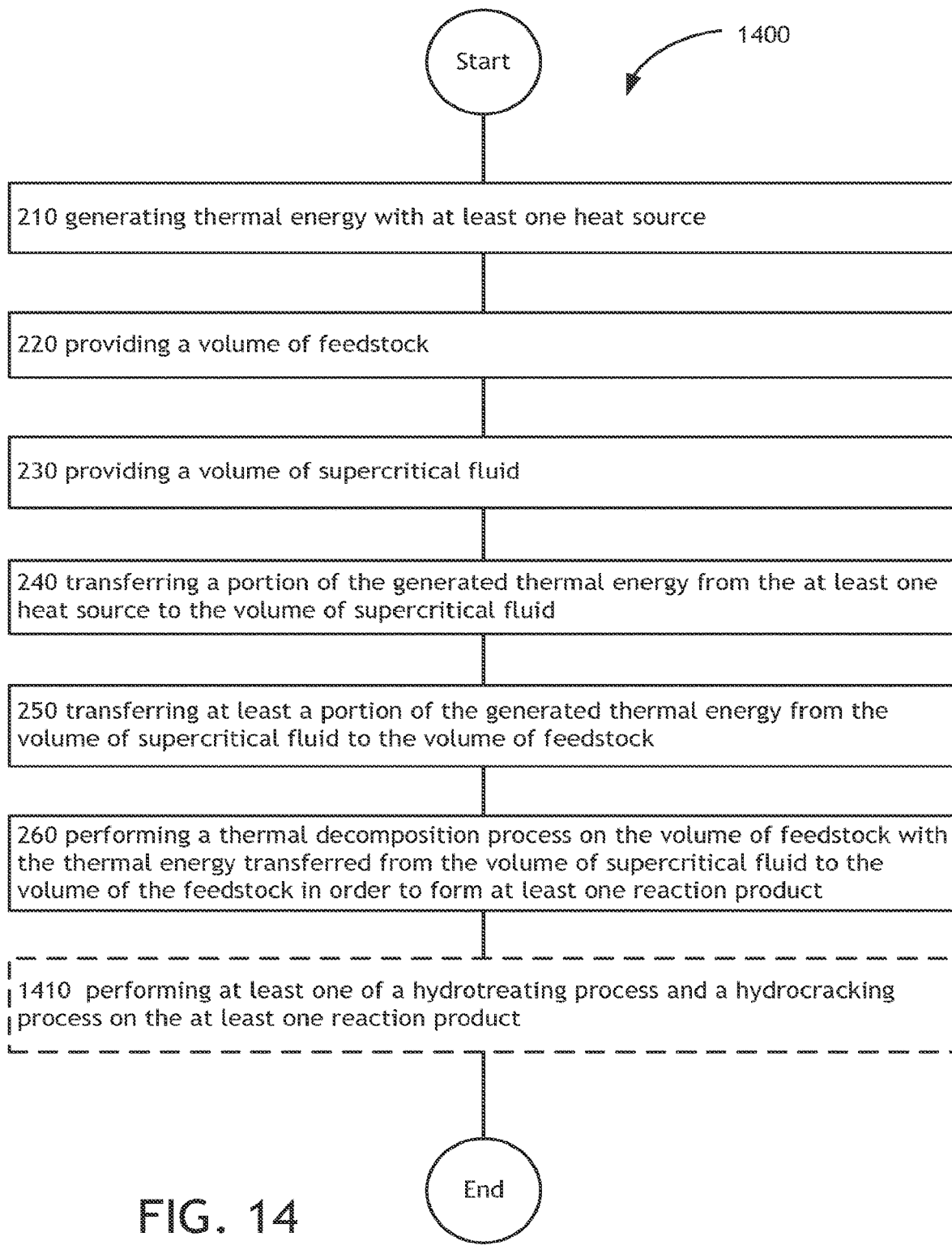

FIG. 14 illustrates an operational flow 1400 representing example operations related to performing thermochemical conversion of a feedstock to a reaction product. FIG. 14 illustrates an example embodiment where the example operational flow 1400 of FIG. 14 may include at least one additional operation. An additional operation may include operation 1410.

The operation 1410 illustrates performing at least one of a hydrotreating process and a hydrocracking process on the at least one reaction product. For example, as shown in FIGS. 1A through 1E, the treatment system 122 may perform a hydrotreating process or a hydrocracking process on one or more reaction products exiting the thermochemical reaction chamber 104.

Figure 15A:
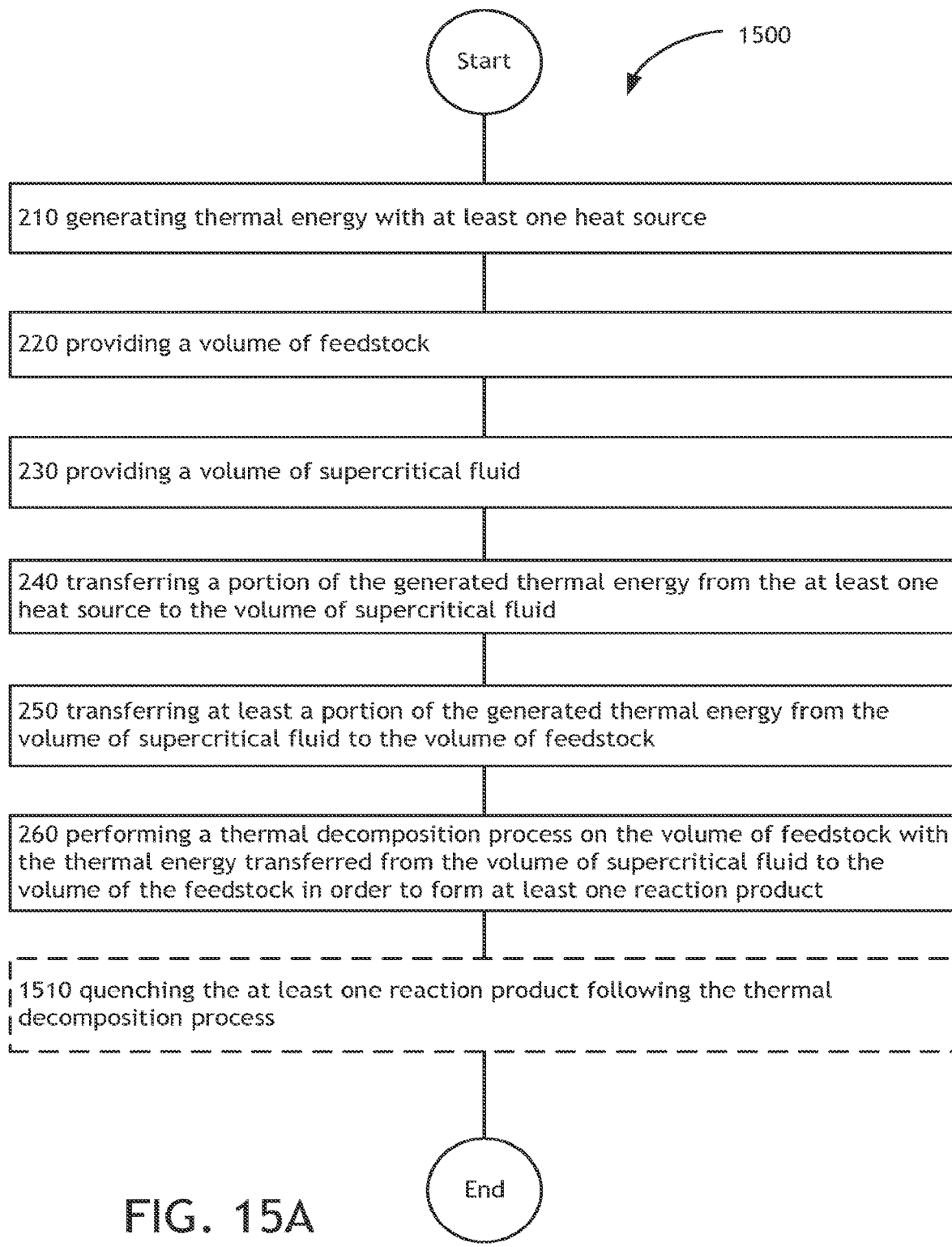

FIG. 15A illustrates an operational flow 1500 representing example operations related to performing thermochemical conversion of a feedstock to a reaction product. FIG. 15A illustrates an example embodiment where the example operational flow 1500 of FIG. 15A may include at least one additional operation. An additional operation may include operation 1510.

The operation 1510 illustrates quenching the at least one reaction product following the thermal decomposition process. For example, as shown in FIGS. 1A through 1E, the quench system 120 may quench one or more reaction products after the one or more reaction products exit the thermochemical reaction chamber 104.

Figure 15B:
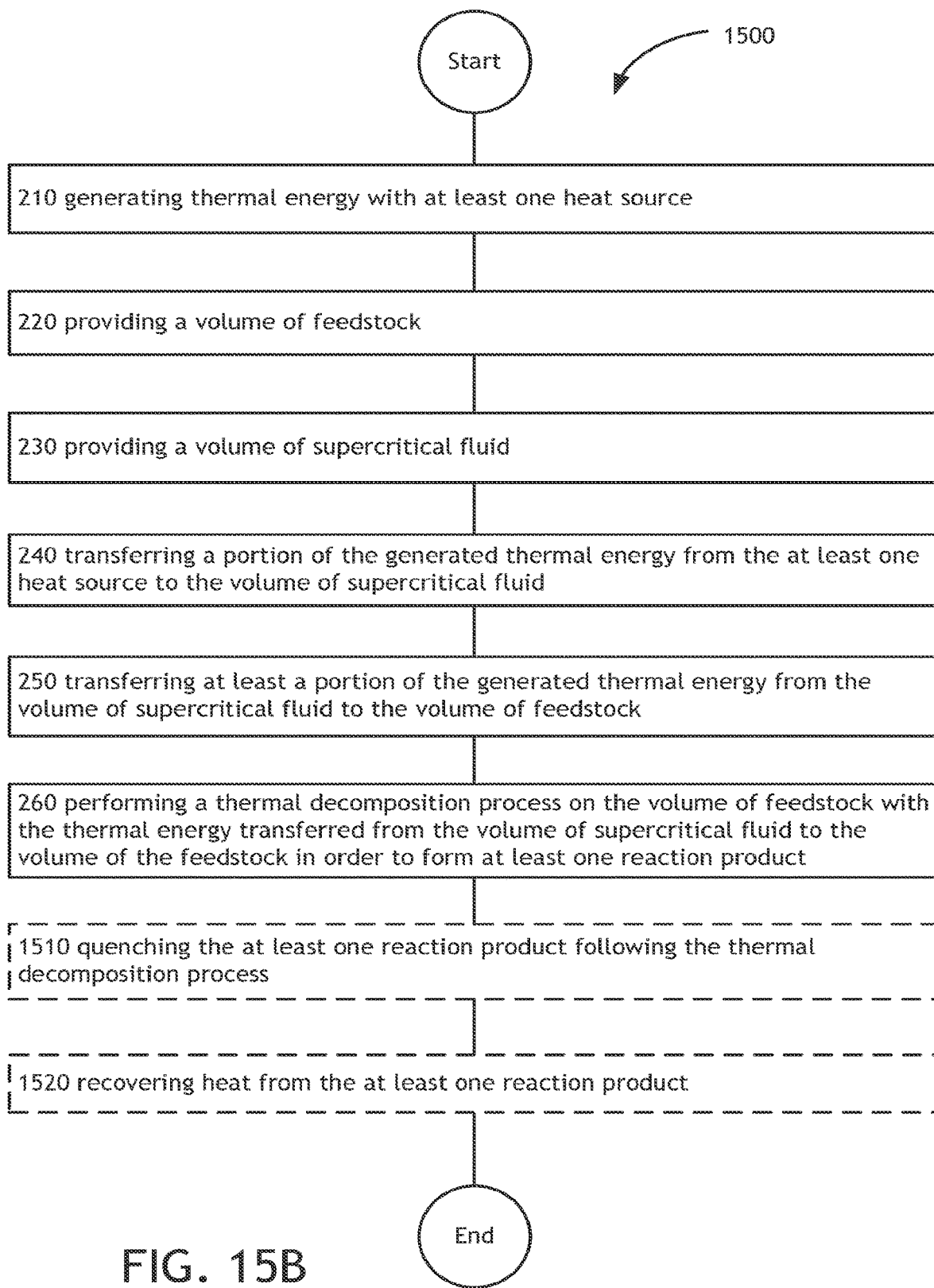

FIG. 15B illustrates additional embodiments of the example operational flow 1500 of FIG. 15A. FIG. 15B illustrates an example embodiment where the example operational flow 1500 of FIG. 15B may include at least one additional operation. An additional operation may include operation 1520.

The operation 1520 illustrates recovering heat from the at least one reaction product. For example, as shown in FIGS. 1A through 1E, a heat recovery system 126 may be coupled to the quench system 120 and configured to recover heat from the quenched one or more reaction products via a heat transfer loop.

Figure 15C:
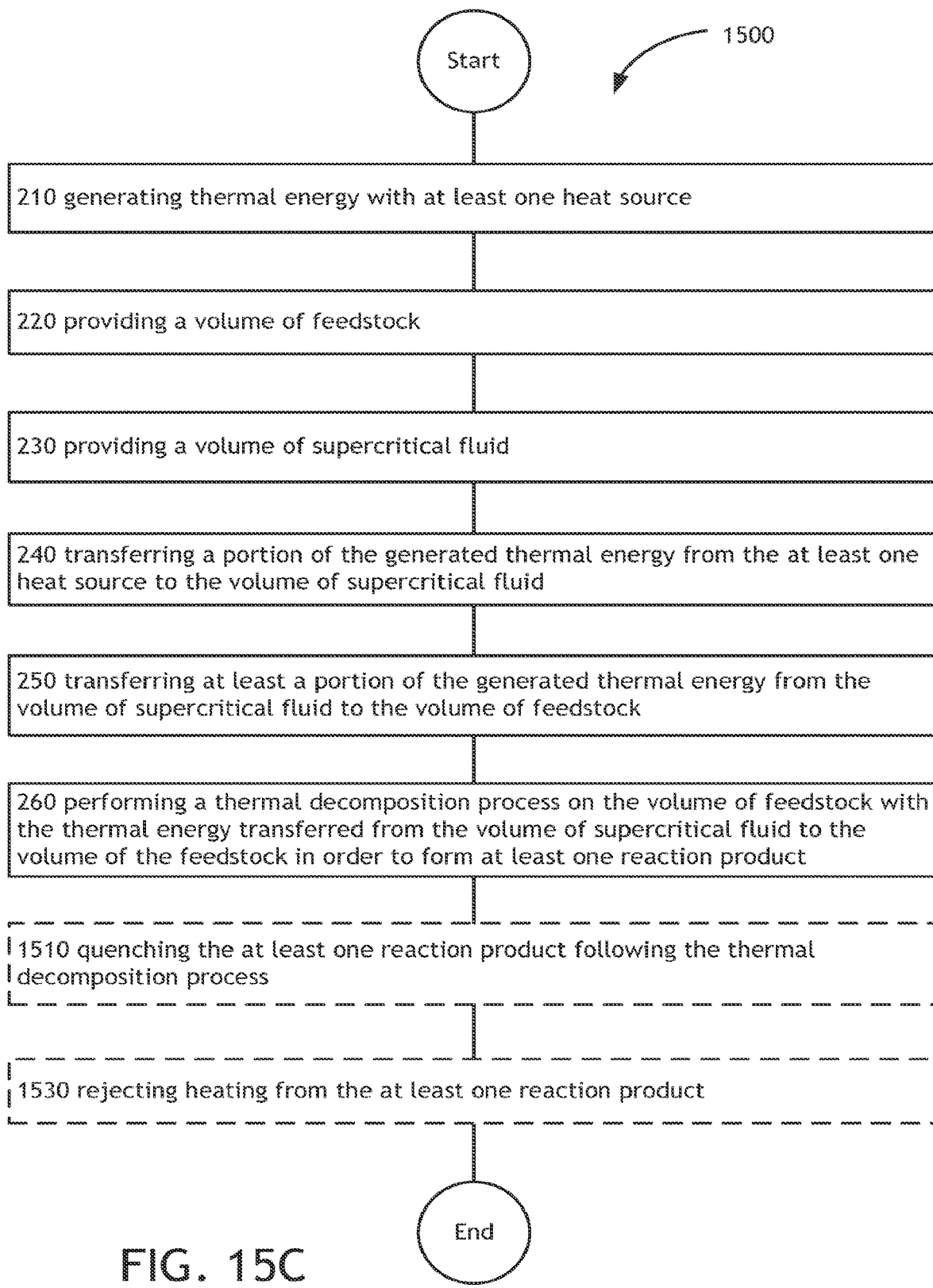

FIG. 15C illustrates additional embodiments of the example operational flow 1500 of FIG. 15A. FIG. 15C illustrates an example embodiment where the example operational flow 1500 of FIG. 15C may include at least one additional operation. An additional operation may include operation 1530.

The operation 1530 illustrates rejecting heating from the at least one reaction product. For example, as shown in FIGS. 1A through 1E, a heat rejection system may be thermally coupled to the thermochemical conversion system 102 and configured to reject heat from the one or more reaction products or the supercritical fluid. For instance, the heat rejection system may be couple to a heat sink and configured to transfer surplus thermal energy stored in the one or more reaction products or the supercritical fluid to the heat sink.

Figure 15D:
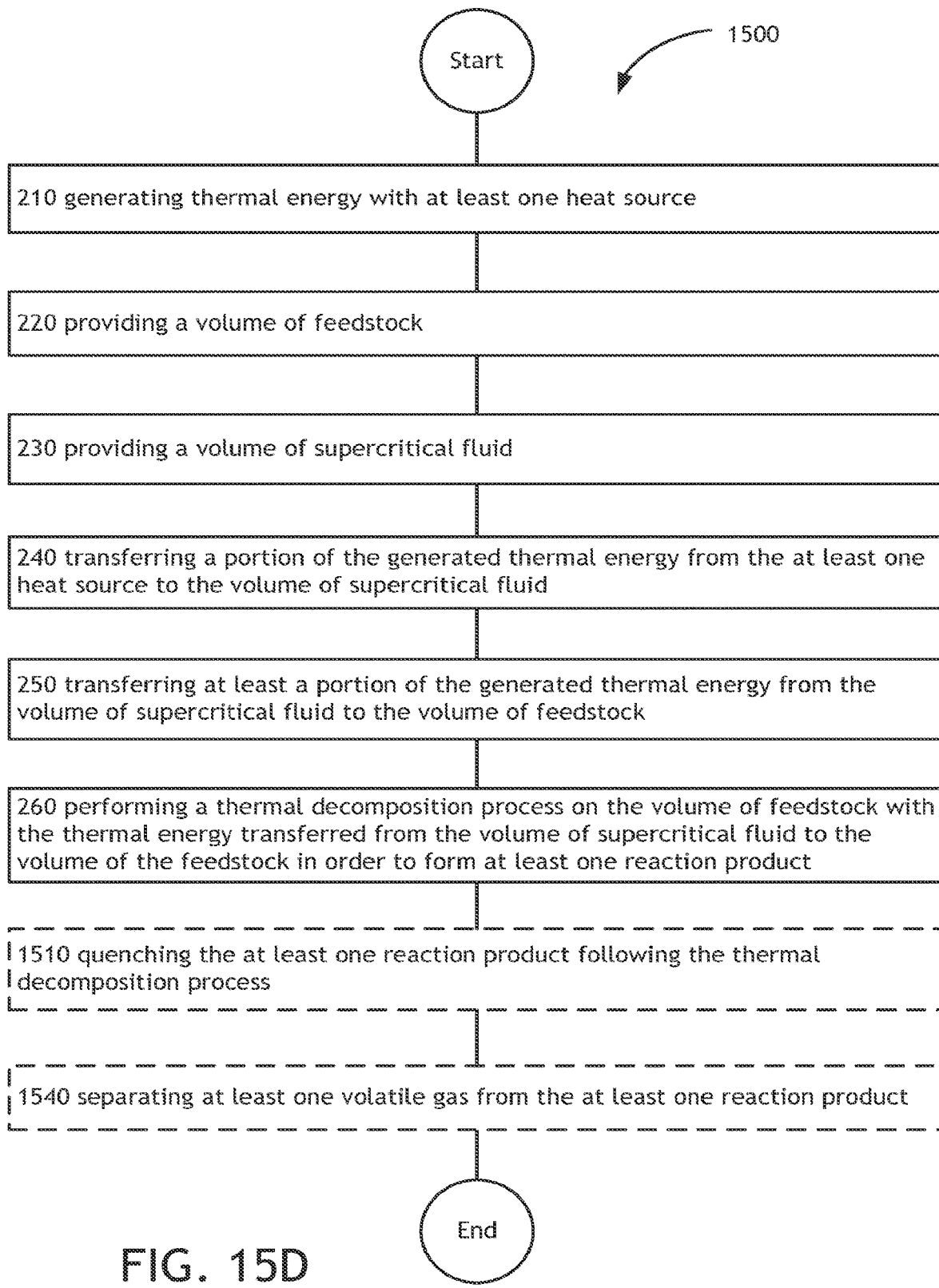

FIG. 15D illustrates additional embodiments of the example operational flow 1500 of FIG. 15A. FIG. 15D illustrates an example embodiment where the example operational flow 1500 of FIG. 15D may include at least one additional operation. An additional operation may include operation 1540.

The operation 1540 illustrates separating at least one volatile gas from the at least one reaction product. For example, as shown in FIGS. 1A through 1E, a gas separator 126 may receive one or more reaction products and separate one or more volatile gas reaction products from non-volatile gas products.

Figure 15E:
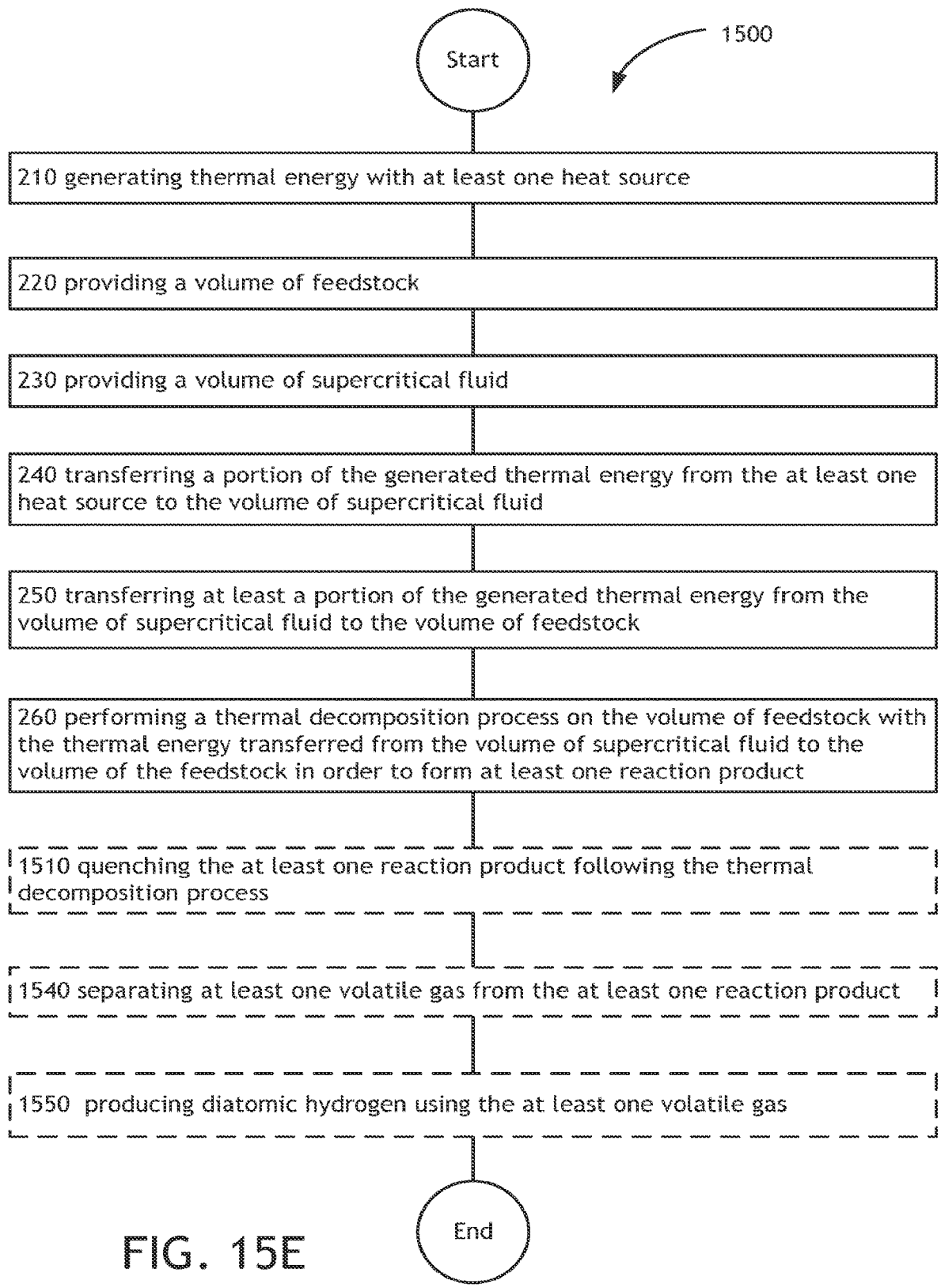

FIG. 15E illustrates additional embodiments of the example operational flow 1500 of FIG. 15A. FIG. 15E illustrates an example embodiment where the example operational flow 1500 of FIG. 15E may include at least one additional operation. An additional operation may include operation 1550.

The operation 1550 illustrates producing diatomic hydrogen using the at least one volatile gas. For example, as shown in FIGS. 1A through 1E, the system 100 may include an uprating system 128. For instance, the uprating system 128 may receive one or more volatile gas reaction products from the gas separator 126 and process the volatile gas reaction products with one or more fuels (e.g., natural gas, electricity and/or water) from an external fuel supply 130. Then, the uprating system 128 may combine the volatile gas reaction products with the external fuel to generate synthesis gas or $H_2$.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device-detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled//implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof; and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs. Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Although a user is shown/described herein as a single illustrated figure, those skilled in the art will appreciate that the user may be representative of a human user, a robotic user (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B.

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

The invention claimed is:

1. A method of pre-treating feedstock prior to thermal decomposition of the feedstock comprising:

heating a first volume of supercritical carbon dioxide to a first temperature;
heating a second volume of supercritical carbon dioxide to a second temperature, the second temperature greater than the first temperature;
providing a feedstock containing at least one impurity to a multi-stage single thermochemical reaction chamber;
extracting some of the at least one impurity from the feedstock in a first location of the multi-stage single thermochemical reaction chamber using the first volume of supercritical carbon dioxide at the first temperature; and
after the extracting, performing a thermal decomposition operation on the feedstock in a second location of the multi-stage single thermochemical reaction chamber, the thermal decomposition operation performed using the second volume of supercritical carbon dioxide at the second temperature.

2. The method of claim 1 wherein providing the feedstock further comprises:
providing feedstock containing at least one impurity selected from one or more of water, oils, lipids, sugars or other oxygenated compounds.

3. The method of claim 1 wherein providing the feedstock further comprises:
providing feedstock containing at least one impurity selected from one or more of the following carbonaceous materials: bituminous coal, sub-bituminous coal, lignite, anthracite, biomass, mixed-source biomaterial, peat, tar, plastic, refuse, and landfill waste.

4. The method of claim 1 wherein heating the first volume of supercritical carbon dioxide to the first temperature further comprises:
heating the first volume of supercritical carbon dioxide to a temperature below 200° C.

5. The method of claim 4 wherein heating the first volume of supercritical carbon dioxide further comprises:
heating the first volume of supercritical carbon dioxide to a temperature between 70-150° C.

6. The method of claim 1 wherein performing the thermal decomposition operation further comprises:
performing a liquefaction operation at a second temperature from 300-500° C.

7. The method of claim 6 wherein the liquefaction operation is selected from solvolysis, depolymerization, hydrogenolysis, and hydrogenation.

8. The method of claim 1 wherein performing the thermal decomposition operation further comprises:
performing a pyrolysis operation at a temperature of 350-600° C.

9. The method of claim 1 wherein performing the thermal decomposition operation further comprises:
performing a pyrolysis operation in an absence of oxygen.

10. The method of claim 1 wherein the extracting further comprises:
collecting and storing some of the at least one impurity extracted from the feedstock.

11. A method of drying feedstock prior to thermal decomposition of the feedstock comprising:
providing a first volume of supercritical carbon dioxide;
providing a wet feedstock having a moisture content level;
determining that the wet feedstock has a moisture content level greater than a threshold dryness level;
intermixing the wet feedstock with the first volume of supercritical carbon dioxide in a first location of a multi-stage single thermochemical reaction chamber thereby drying the wet feedstock to obtain a dried feedstock;

after the moisture level of the dried feedstock has been dried to or below the threshold dryness level, transferring the dried feedstock from the first location to a second location of the multi-stage single thermochemical reaction chamber;

intermixing a second volume of supercritical carbon dioxide at a different temperature than the first volume of supercritical carbon dioxide with the dried feedstock in the second location; and performing a thermal decomposition operation in a reduced oxygen environment in the second location.

12. The method of claim 11 wherein transferring the dried feedstock from the first location further comprises:

transferring the dried feedstock from the first location to the second location after the dried feedstock reaches 5-15% moisture content by weight.

13. The method of claim 12 wherein the drying is performed at a temperature below 200° C.

14. The method of claim 11 wherein performing the thermal decomposition operation further comprises:

performing a liquefaction process at a liquefaction temperature from 300-500° C.

15. The method of claim 14 wherein the liquefaction process is selected from solvolysis, depolymerization, hydrogenolysis, and hydrogenation.

16. The method of claim 11 wherein performing the thermal decomposition operation comprises:

performing a pyrolysis process on the dried feedstock.

17. The method of claim 16 wherein performing a pyrolysis process further comprises:

performing the pyrolysis process in an absence of oxygen.

18. The method of claim 11 wherein the drying includes removing at least one impurity selected from oils, lipids, sugars or other oxygenated compounds.

19. The method of claim 11 wherein the feedstock includes one or more of the following carbonaceous materials: bituminous coal, sub-bituminous coal, lignite, anthracite, biomass, mixed-source biomaterial, peat, tar, plastic, refuse, and landfill waste.

20. The method of claim 11 further comprising:

monitoring the moisture level of the dried feedstock to determine when the dried feedstock is at or below the threshold dryness level.

\* \* \* \* \*